(12) United States Patent
Wheelwright

(10) Patent No.: US 10,012,394 B2
(45) Date of Patent: Jul. 3, 2018

(54) SMART WATER HEATER

(71) Applicant: Vivint, Inc., Provo, UT (US)

(72) Inventor: Jeffrey Glen Wheelwright, Layton, UT (US)

(73) Assignee: Vivint, Inc., Provo, UT (US)

(*) Notice: Subject to any disclaimer, the term of this patent is extended or adjusted under 35 U.S.C. 154(b) by 649 days.

(21) Appl. No.: 14/586,642

(22) Filed: Dec. 30, 2014

(65) Prior Publication Data

US 2016/0187004 A1    Jun. 30, 2016

(51) Int. Cl.

| | | |
|---|---|---|
| *F24F 11/053* | (2006.01) | |
| *G05D 23/00* | (2006.01) | |
| *F23N 1/08* | (2006.01) | |
| *F24D 3/00* | (2006.01) | |
| *G05D 3/12* | (2006.01) | |
| *F24D 19/10* | (2006.01) | |
| *F24H 9/20* | (2006.01) | |
| *G05D 23/19* | (2006.01) | |

(52) U.S. Cl.
CPC ....... *F24D 19/1063* (2013.01); *F24H 9/2007* (2013.01); *G05D 23/1904* (2013.01)

(58) Field of Classification Search
CPC .............. F24D 19/1063; F24H 9/2007; G05D 23/1904
USPC ................. 236/1 C, 20 R; 700/278, 291, 296
See application file for complete search history.

(56) References Cited

U.S. PATENT DOCUMENTS

| | | | | |
|---|---|---|---|---|
| 3,870,228 | A * | 3/1975 | Moseley, Jr. | F24D 17/00 122/13.3 |
| 4,337,388 | A * | 6/1982 | July | G05D 23/1906 219/494 |
| 4,449,178 | A * | 5/1984 | Blau, Jr. | G05D 23/1923 219/492 |
| 4,847,782 | A * | 7/1989 | Brown, Jr. | H02J 13/0086 307/38 |
| 2003/0096572 | A1* | 5/2003 | Gutta | F24F 11/0034 454/229 |
| 2004/0225654 | A1* | 11/2004 | Banavar | G06F 17/30867 |
| 2008/0122637 | A1* | 5/2008 | Meyer | F24D 19/1051 340/584 |
| 2009/0211644 | A1* | 8/2009 | Wylie | F24D 17/0078 137/2 |
| 2010/0096018 | A1* | 4/2010 | Wylie | F24D 17/0078 137/2 |

(Continued)

*Primary Examiner* — Henry Crenshaw
(74) *Attorney, Agent, or Firm* — Holland & Hart LLP

(57) ABSTRACT

The systems and methods described herein relate to heating ventilation and air conditioning (HVAC) systems and water heating systems in relation to a building and residential automation system. Some embodiments of the systems and methods described herein relate to HVAC systems and water systems in relation to an integration of building or residential automation systems. Specifically, the disclosure relates to maintaining a desirable water temperature for a desirable time period. By reducing unnecessary heating of water, the systems disclosed herein may result in fewer wasted resources and a lower utility bill. In one embodiment, a method for security and/or automation systems may be disclosed. The method may comprise monitoring a status of a water heater and monitoring an occupancy status of a residence. The status of the water heater may adjust, automatically, based at least in part on the monitoring.

20 Claims, 12 Drawing Sheets

(56) References Cited

U.S. PATENT DOCUMENTS

| | | | |
|---|---|---|---|
| 2010/0106332 A1* | 4/2010 | Chassin | G06Q 20/102 |
| | | | 700/278 |
| 2010/0145534 A1* | 6/2010 | Forbes, Jr. | G06Q 10/00 |
| | | | 700/291 |
| 2011/0031323 A1* | 2/2011 | Nold | G05B 19/0428 |
| | | | 236/20 R |
| 2013/0073094 A1* | 3/2013 | Knapton | F24F 11/0034 |
| | | | 700/278 |
| 2014/0026970 A1* | 1/2014 | DuPlessis | G05D 23/132 |
| | | | 137/3 |
| 2015/0083813 A1* | 3/2015 | Chen | G05D 23/1904 |
| | | | 236/1 C |

* cited by examiner

SMART WATER HEATER

BACKGROUND

The present disclosure, for example, relates to security and/or automation systems, and more particularly to monitor the settings and adjustments of a water heater for a residence.

Security and automation systems are widely deployed to provide various types of communication and functional features such as monitoring, communication, notification, and/or others. These systems may be capable of supporting communication with a user through a communication connection or a system management action.

With the wide-spread use of computers and mobile devices has come an increased presence of and continued advancements in building and residential automation, and building and residential heating ventilation and air conditioning (HVAC) systems as well as hot water sources and the like. Many homes are equipped with HVAC systems and hot water systems. However, residences may experience inconsistent heating throughout the home which result in an uncomfortable experience for an occupant. Additionally, many homes are equipped with water heaters, which may use a large amount of energy to maintain water in a holding tank at a desired water temperature. However, if hot water is not in demand, the water heater may be maintaining a desired water temperature for a time period where heated water is not necessary. This may result in a waste of energy resources. Additionally, it may result in an undesirable utility bill for a home owner.

SUMMARY

The systems and methods described herein relate to building and residential automation and security systems. More specifically, the systems and methods described herein relate to heating ventilation and air conditioning (HVAC) systems and water heating systems in relation to a building and residential automation system. Some embodiments of the systems and methods described herein relate to HVAC systems and water systems in relation to an integration of building or residential automation systems. Specifically, the disclosure relates to maintaining a desirable water temperature for a desirable time period. By reducing unnecessary heating of water, the systems disclosed herein may result in fewer wasted resources and a lower utility bill.

In one embodiment, a method for security and/or automation systems may be disclosed. The method may comprise monitoring a status of a water heater and monitoring an occupancy status of a residence. The status of the water heater may adjust, automatically, based at least in part on the monitoring.

In further embodiments, the method may predict zero occupancy of the residence for a predetermined time period; and lower, automatically, a set internal water temperature of the water heater based at least in part on the predicting. In some embodiments, the internal water temperature of the water heater may be lowered, automatically, to a predetermined temperature when the automation system is set to vacation status. Additionally, the internal water temperature of the water heater may be increased, automatically, to a predetermined temperature a predetermined time before the vacation status expires.

The method may increase, automatically, the internal water temperature of the water heat to a predetermined temperature a predetermined time before the occupancy status of a residence exceeds zero. A predetermined water temperature of water within the water heater may be maintained when the occupancy status exceeds zero, wherein the predetermined water temperature is between 110 and 160 degrees Fahrenheit. The occupancy status of the residence may be determined to be at rest. A set internal water temperature of the water heater may be lowered based at least in part on the determining.

The occupancy status of the residence may be determined to be at rest. A set internal water temperature of the water heater may be lowered based at least in part on the determining. The method may detect when an internal water temperature of the water heater exceeds one or more safety limits and alert a user based at least in part on the detecting.

The method may maintain a sanitization water temperature of the water heater and set a tempering valve temperature to a lower temperature than the sanitization water temperature. The method may increase, automatically, the water temperature of the water heater and maintain, automatically, the water temperature at the tempering valve. The method may calculate an approximate energy savings based at least in part on the adjusting, generate an energy savings report based at least in part on the calculating, and distribute the report to a user of the automation system.

In another embodiment, an apparatus for security and/or automation systems may be disclosed. The apparatus may comprise a processor, memory in electronic communication with the processor, and instructions stored in the memory. The instructions may be executable by the processor to monitor a status of a water heater, monitor an occupancy status of a residence, and adjust, automatically, the status of the water heater based at least in part on the monitoring.

In a further embodiment, a non-transitory computer-readable medium storing computer-executable code for security and/or automation systems is disclosed. The code may be executable by a processor to monitor a status of a water heater, monitor an occupancy status of a residence, and adjust, automatically, the status of the water heater based at least in part on the monitoring.

The foregoing has outlined rather broadly the features and technical advantages of examples according to this disclosure so that the following detailed description may be better understood. Additional features and advantages will be described below. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein—including their organization and method of operation—together with associated advantages will be better understood from the following description when considered in connection with the accompanying figures. Each of the figures is provided for the purpose of illustration and description only, and not as a definition of the limits of the claims.

BRIEF DESCRIPTION OF THE DRAWINGS

A further understanding of the nature and advantages of the present disclosure may be realized by reference to the following drawings. In the appended figures, similar components or features may have the same reference label. Further, various components of the same type may be distinguished by following a first reference label with a dash and a second label that may distinguish among the similar components. However, features discussed for various components—including those having a dash and a second reference label—apply to other similar components. If only the first reference label is used in the specification, the description is applicable to any one of the similar components having the same first reference label irrespective of the second reference label.

DETAILED DESCRIPTION

One aspect of the disclosure relates to systems, methods and related devices for improving heating ventilation and air conditioning (HVAC) systems. Present HVAC systems are typically controlled by a centrally located thermostat. The centrally located thermostat usually controls a single HVAC heating and cooling unit. A user may configure the thermostat to turn on cooling when the thermostat registers a temperature that satisfies a programmed threshold, and set the thermostat to turn on heating when the thermostat registers a temperature that satisfies another programmed threshold. For example, a user may set the thermostat to trigger heating via turning on a furnace when the thermostat registers 68 degrees Fahrenheit or less. Likewise, a user may set the thermostat to trigger cooling via the air conditioning unit when the thermostat registers 72 degrees Fahrenheit or more.

Another aspect of the disclosure relates to systems, methods, and devices for improving efficiency at a hot water heater. Hot water heaters may provide water at a desired elevated temperature to users and inhabitants of the home. Residences may additionally be coupled with home automation and/or security systems. The water heaters may use energy to maintain the water at a desired water temperature. For example, water heaters may maintain a water temperature of 120 to 140 degrees Fahrenheit. To achieve this water temperature, a water heater may use electricity, gas, oil, or another energy source. If hot water is not needed, the water heater may unnecessarily maintain a predetermined water temperature. However, a user may preserve energy and lower energy bills if the water heater is smartly managed.

The following description provides examples and is not limiting of the scope, applicability, and/or examples set forth in the claims. Changes may be made in the function and/or arrangement of elements discussed without departing from the scope of the disclosure. Various examples may omit, substitute, and/or add various procedures and/or components as appropriate. For instance, the methods described may be performed in an order different from that described, and/or various steps may be added, omitted, and/or combined. Also, features described with respect to some examples may be combined in other examples.

Figure 1:
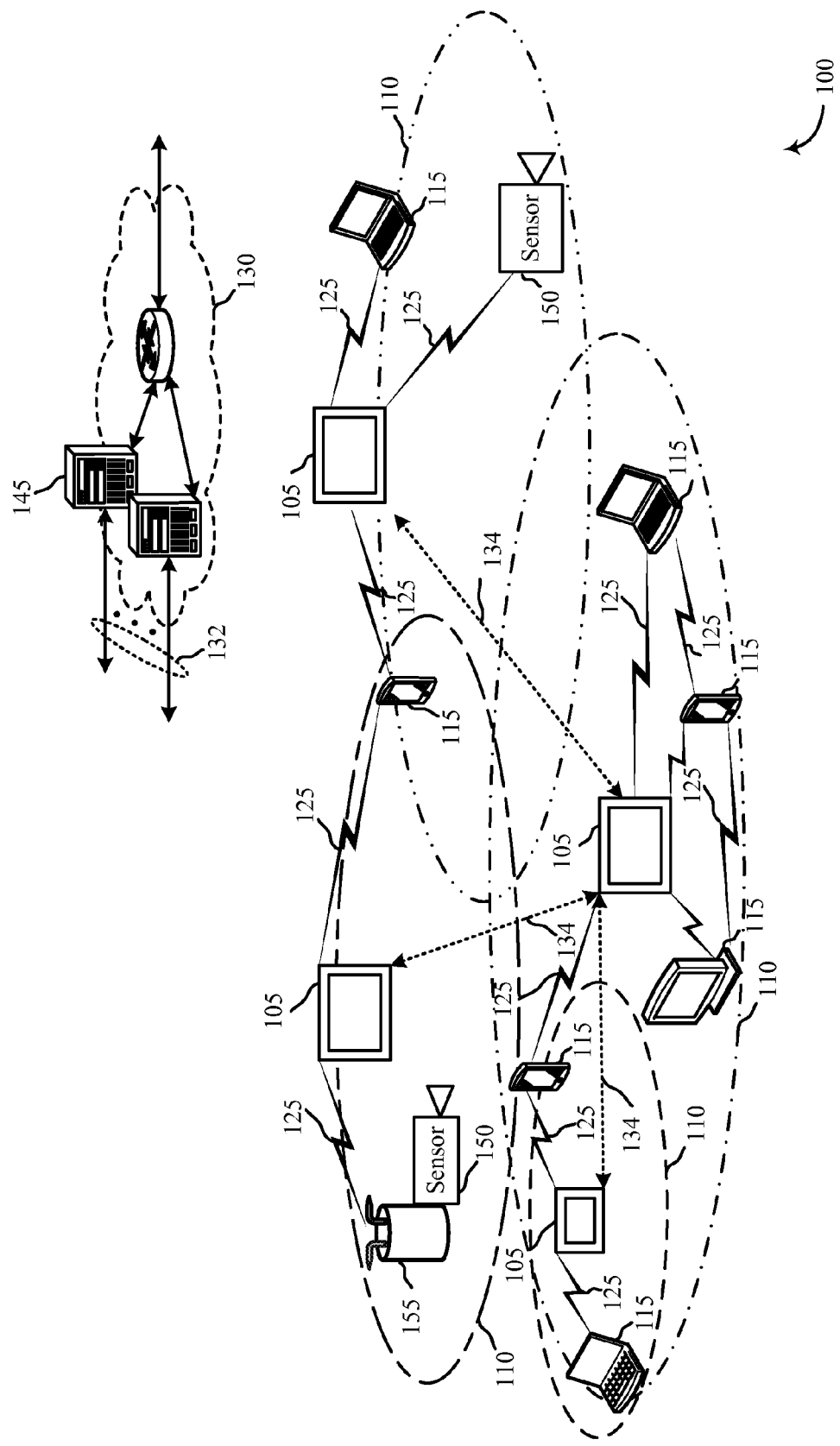
FIG. 1 shows a block diagram relating to a security and/or an automation system, in accordance with various aspects of this disclosure.

FIG. 1 illustrates an example of a communications system 100 in accordance with various aspects of the disclosure. The communications system 100 may include control panels 105, devices 115, sensors 150, and/or a network 130. The network 130 may provide user authentication, encryption, access authorization, tracking, Internet Protocol (IP) connectivity, and other access, calculation, modification, and/or functions. The control panels 105 may interface with the network 130 through wired and/or wireless communication links 132 to communication with one or more remote servers 145. The control panels 105 may perform communication configuration, adjustment, and/or scheduling for communication with the devices 115, or may operate under the control of a controller. In various examples, the control panels 105 may communicate—either directly or indirectly (e.g., through network 130)—with each other over wired and/or wireless communication links 134. Control panels 105 may communicate with a back end server (such as the remote servers 145)—directly and/or indirectly—using one or more communication links.

The control panels 105 may wirelessly communicate with the devices 115 via one or more antennas. Each of the control panels 105 may provide communication coverage for a respective geographic coverage area 110. In some examples, control panels 105 may be referred to as a control device, a base transceiver station, a radio base station, an access point, a radio transceiver, or some other suitable terminology. The geographic coverage area 110 for a control panel 105 may be divided into sectors making up only a portion of the coverage area. The communications system 100 may include control panels 105 of different types. There may be overlapping geographic coverage areas 110 for one or more different parameters, including different technologies, features, subscriber preferences, hardware, software, technology, and/or methods. For example, each control panel 105 may be related to one or more discrete structures (e.g., a home, a business) and each of the one more discrete structures may be related to one or more discrete areas. In other examples, multiple control panels 105 may be related to the same one or more discrete structures (e.g., multiple control panels relating to a home and/or a business complex).

The devices 115 may be dispersed throughout the communications system 100 and each device 115 may be stationary and/or mobile. A device 115 may include a cellular phone, a personal digital assistant (PDA), a wireless modem, a wireless communication device, a handheld device, a tablet computer, a laptop computer, a cordless phone, a wireless local loop (WLL) station, a display device (e.g., TVs, computer monitors, etc.), a printer, a camera, and/or the like. A device 115 may also include or be referred to by those skilled in the art as a user device, a smartphone, a BLUETOOTH® device, a Wi-Fi device, a mobile station, a subscriber station, a mobile unit, a subscriber unit, a wireless unit, a remote unit, a mobile device, a wireless device, a wireless communications device, a remote device, an access terminal, a mobile terminal, a wireless terminal, a remote terminal, a handset, a user agent, a mobile client, a client, and/or some other suitable terminology.

The sensors 150 may be dispersed throughout the communications system 100 and each sensor 150 may be stationary and/or mobile. A sensor 150 may include and/or be one or more sensors that sense: proximity, motion, temperatures, humidity, sound level, smoke, structural features (e.g., glass breaking, window position, door position), time, light geo-location data of a user and/or a device, distance, biometrics, weight, speed, height, size, preferences, light, darkness, weather, time, system performance, and/or other inputs that relate to a security and/or an automation system. The sensor 150 may comprise a controller to monitor temperatures of an area and/or room of a building and adjust one or more louvers in a building. In some embodiments, one or more sensors 150 may be proximate one or more water heaters 155. The sensor 150 may additional comprise a controller to monitor conditions and status of the water heater 155 and adjust one or more settings of the water heater 155 appropriately. A device 115 and/or a sensor 150 may be able to communicate through one or more wired and/or wireless connections with various components such as control panels, base stations, and/or network equipment (e.g., servers, wireless communication points, etc.) and/or the like.

The communication links 125 shown in communications system 100 may include uplink (UL) transmissions from a device 115 to a control panel 105, and/or downlink (DL) transmissions, from a control panel 105 to a device 115. The downlink transmissions may also be called forward link transmissions while the uplink transmissions may also be called reverse link transmissions. Each communication link 125 may include one or more carriers, where each carrier may be a signal made up of multiple sub-carriers (e.g., waveform signals of different frequencies) modulated according to the various radio technologies. Each modulated signal may be sent on a different sub-carrier and may carry control information (e.g., reference signals, control channels, etc.), overhead information, user data, etc. The communication links 125 may transmit bidirectional communications and/or unidirectional communications. Communication links 125 may include one or more connections, including but not limited to, 345 MHz, Wi-Fi, BLUETOOTH®, BLUETOOTH® Low Energy, cellular, Z-WAVE®, 802.11, peer-to-peer, LAN, WLAN, Ethernet, fire wire, fiber optic, and/or other connection types related to security and/or automation systems.

In some embodiments, of communications system 100, control panels 105 and/or devices 115 may include one or more antennas for employing antenna diversity schemes to improve communication quality and reliability between control panels 105 and devices 115. Additionally or alternatively, control panels 105 and/or devices 115 may employ multiple-input, multiple-output (MIMO) techniques that may take advantage of multi-path, mesh-type environments to transmit multiple spatial layers carrying the same or different coded data.

While the devices 115 may communicate with each other through the control panel 105 using communication links 125, each device 115 may also communicate directly with one or more other devices via one or more direct communication links 134. Two or more devices 115 may communicate via a direct communication link 134 when both devices 115 are in the geographic coverage area 110 or when one or neither devices 115 is within the geographic coverage area 110. Examples of direct communication links 134 may include Wi-Fi Direct, BLUETOOTH®, wired, and/or, and other P2P group connections. The devices 115 in these examples may communicate according to the WLAN radio and baseband protocol including physical and MAC layers from IEEE 802.11, and its various versions including, but not limited to, 802.11b, 802.11g, 802.11a, 802.11n, 802.11ac, 802.11ad, 802.11ah, etc. In other implementations, other peer-to-peer connections and/or ad hoc networks may be implemented within communications system 100.

In one embodiment, the communications systems 100 may remedy the problems of current HVAC systems by employing multiple thermometers (instead of thermostats) throughout areas of the building and actuating motorized louvers on the HVAC registers to adjust airflow in each room of the building. The motorized louvers may be actuated to be fully open allowing a maximum airflow through the register (e.g., 100% of maximum airflow), actuated to be fully closed allowing a minimum airflow (e.g., 0% of maximum airflow), and actuated to variations between max/min (e.g., 50% of maximum airflow, 35% of maximum airflow, 10% of maximum airflow, etc.). In some embodiments, a majority of the rooms and/or areas of the building may include a thermometer. A control panel 105 may monitor the temperatures of each area/room of the building and initiate a command to adjust the motorized louvers accordingly. Each room may include a climate policy. Using the example of a home, the master bedroom, spare bedroom, family room, kitchen, and bathroom of the home may each include a thermometer. Each room may also include one or more HVAC registers with motorized louvers. The motorized louvers may be controllable by the control panel 105 sending commands to a sensor 150. Thus, each HVAC register may be associated with a sensor 150 configured to communicate between the thermometer and the control panel 105. Each room/area of the home may include a climate policy. Thus, the master bedroom may include a climate policy different than the climate policy for the kitchen, and so forth. For example, the master bedroom may include a climate policy that stipulates a high temperature threshold of 73 degrees Fahrenheit and a low temperature threshold of 68 degrees Fahrenheit, whereas the kitchen climate policy may stipulate a high temperature threshold of 75 degrees Fahrenheit and a low temperature threshold of 70 degrees Fahrenheit. The control panel 105 may adjust the airflow of each HVAC register based on the individual room/area climate policies.

In some embodiments, a sensor 150 may be located proximate an HVAC register. In some cases, a sensor 150 may be located on the thermometer of each room/area. In some cases, a sensor 150 may be located separate from the HVAC register and/or the thermometer. Accordingly, the control panel 105 may determine the temperature of each area/room of the home by communicating with the local sensors 150 of each area/room. The control panel 105 may determine the outside temperature and time of day. The control panel 105 may analyze together and/or separately the indoor temperatures of each area/room, the time of day, and the outdoor temperature in relation to the climate policies of each area/room. Based on this analysis, the control panel 105 may send a first command to the sensor 150 of the master bedroom to throttle the louvers of the HVAC register in the master bedroom to 50% of maximum airflow. Likewise, the control panel 105 may send a second command to the sensor 150 of the spare bedroom to throttle the louvers of the HVAC register in the spare bedroom to 65% of maximum airflow, and similarly the family room to 30% of maximum airflow, the kitchen to 25% of maximum airflow, and the bathroom to 10% of maximum airflow. Accordingly, in an automated fashion, without human intervention, the control panel 105 may ensure that certain areas of the home receive more airflow than other areas. As a result, each room receives customized heating and cooling. The system may switch between heating and cooling and adjust the airflow arrangement for each room without any human intervention. It is typical for outdoor temperatures to vary widely in the spring and fall seasons. One day in spring may be relatively cool in which the furnace may be activated, and the next day relatively hot in which the air conditioning unit may be activated. In the typical home, a user may have to adjust each HVAC register by hand from day to day in such cases. With the systems and methods described herein, however, the control panel 105 of a home automatically adjusts the airflow for each controlled room, ensuring a desired comfort level in each area of the home.

In some embodiments, the control panel 105 may monitor airflow at the HVAC heating and cooling unit. Without sufficient airflow, an air conditioning evaporator coil may freeze over, disabling the air conditioning. Accordingly, the control panel 105 may monitor the airflow for the HVAC system and adjust the airflow values for each room/area of the building. If the control panel 105 detects insufficient airflow at the HVAC heating and cooling unit, then the control panel 105 may send a command to one or more rooms to increase the amount of airflow through the HVAC registers of those one or more rooms. For example, if the control panel 105 detects insufficient airflow at the HVAC heating and cooling unit, then the control panel 105 may send a command for the kitchen to increase airflow from 25% of maximum airflow to 50% of maximum airflow. Benefits may be realized by the abovementioned systems and methods, including improved efficiencies relative to HVAC systems, improved levels of comfort, and less wasted energy.

Another aspect of the communications system 100 may improve the efficiency of an HVAC system via window shading. For example, automated blinds may register as facing north, south, east, or west. The control panel 105 may reference the current position of the sun and the current weather. For example, the control panel 105 may reference the WEATHER CHANNEL® to calculate the position of the sun relative to the building and determine whether the sky is overcast. If the sun is visible (e.g., sky is not overcast) and a room is configured to be cooled, then the control panel 105 may close the automated blinds of a room facing the sun. If the room is configured to be heated and the sun is visible, then the automated blinds may be opened by a command from the control panel 105. Thus, if a room with an east-facing window and a room with a west-facing window are configured to be cooled, during the morning hours the automation system may shut the east-facing blinds to block out the heat from the sun and open the west-facing blinds to let in the morning light. As the day progresses, the east-facing blinds may be opened, but the west-facing blinds may be closed to block heat from the afternoon sun. The opposite behaviors may be used to warm a home with solar energy (e.g., during the winter months).

In some embodiments, one or more sensors 150 may be proximate the water heater 155. The control panel 105 may monitor and send one or more commands to sensors 150 proximate the water heater 155. The sensors may monitor one or more conditions of the water heater 155 and relate those conditions to the control panel 105. The sensors 150 may then adjust one or more settings of the water heater 155 based on commands form the control panel 105. For example, the sensors 150 may detect an internal temperature of the water heater 155 and report the temperature to the control panel 105. Additionally, the sensors 150 may detect one or more dangerous conditions proximate the water heater 155 and report those conditions back to the control panel 105. The control panel 105 may analyze the information along with other received and/or perceived information to adjust the water heater 155 via the sensors 150.

Figure 2:
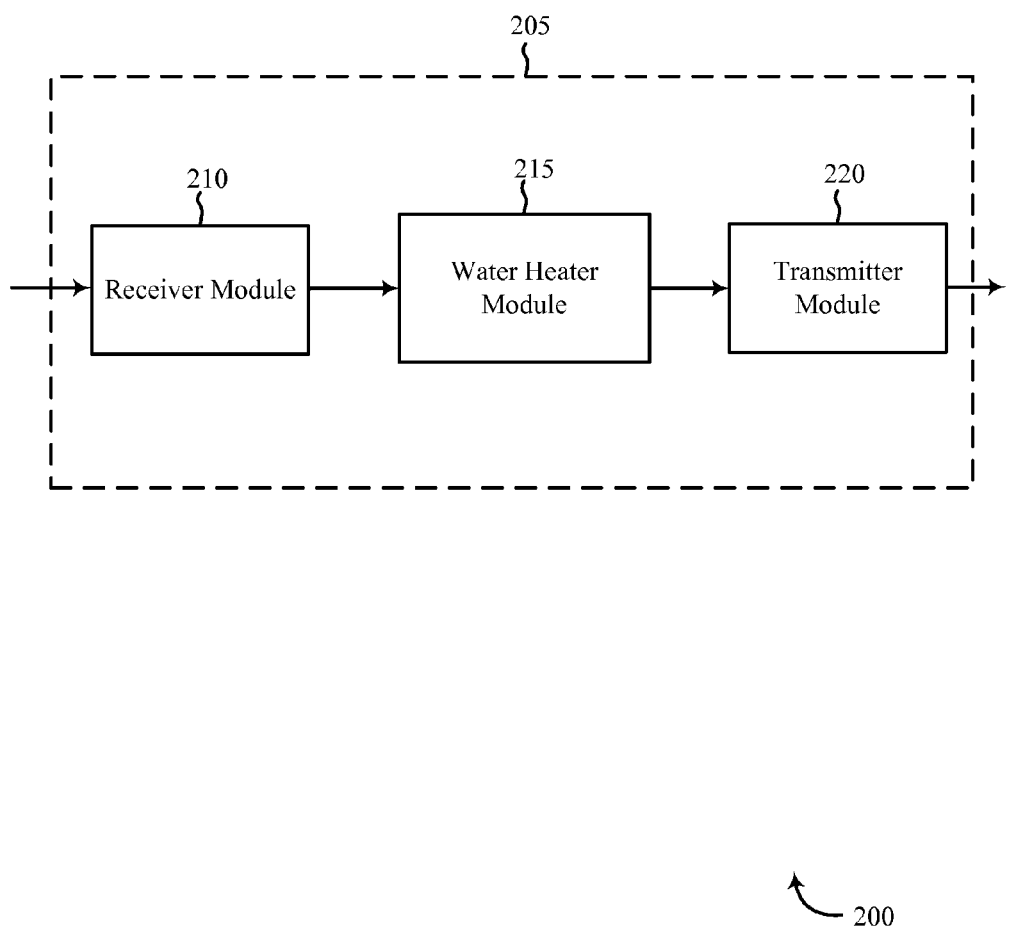
FIG. 2 shows a block diagram of a device relating to a security and/or an automation system, in accordance with various aspects of this disclosure.

FIG. 2 shows a block diagram 200 of a control panel 205 for use in electronic communication, in accordance with various aspects of this disclosure. The control panel 205 may be an example of one or more aspects of a control panel 105 described with reference to FIG. 1. The control panel 205 may include a receiver module 210, a water heater module 215, and/or a transmitter module 220. The control panel 205 may also be or include a processor. Each of these modules may be in communication with each other—directly and/or indirectly.

The components of the control panel 205 may, individually or collectively, be implemented using one or more application-specific integrated circuits (ASICs) adapted to perform some or all of the applicable functions in hardware. Alternatively, the functions may be performed by one or more other processing units (or cores), on one or more integrated circuits. In other examples, other types of integrated circuits may be used (e.g., Structured/Platform ASICs, Field Programmable Gate Arrays (FPGAs), and other Semi-Custom ICs), which may be programmed in any manner known in the art. The functions of each module may also be implemented—in whole or in part—with instructions embodied in memory formatted to be executed by one or more general and/or application-specific processors.

The receiver module 210 may receive information such as packets, user data, and/or control information associated with various information channels (e.g., control channels, data channels, etc.). The receiver module 210 may be configured to receive one or more inputs from one or more sensors (e.g. sensors 150, FIG. 1) proximate a water heater (e.g. water heater 155, FIG. 1). Information may be passed on to the water heater module 215, and to other components of the control panel 205.

The water heater module 215 may maintain, record, monitor, adjust various aspects of the water heater. The water heater module 215 may attempt to maintain the water heater at in an energy efficient manner while still providing and supplement all the hot water needs for a residence. For example, the water heater module 215 may set one or more water temperatures for the water heater based on one or more settings and components. The water heater module 215 may set the operating water temperature at a sanitation level to sanitize and purify the water, potentially eliminating any bacteria inside the water heater. The water temperature may be adjusted based on other factors. The water temperature may be decreased when hot water is not in high demand or the residence has an occupancy count reaching zero. The water heater module 215 may additionally monitor the water temperature and alert a user of any potentially harmful events.

The transmitter module 220 may transmit the one or more signals received from other components of the control panel 205. The transmitter module 220 may transmit one or more commands to the one or more sensors proximate the water heater. The transmitter module 220 may additionally transmit one or more pieces of information, request, alerts, or the like to a user associated with the automation system and/or a server associated with the automation system. In some examples, the transmitter module 220 may be collocated with the receiver module 210 in a transceiver module.

Figure 3:
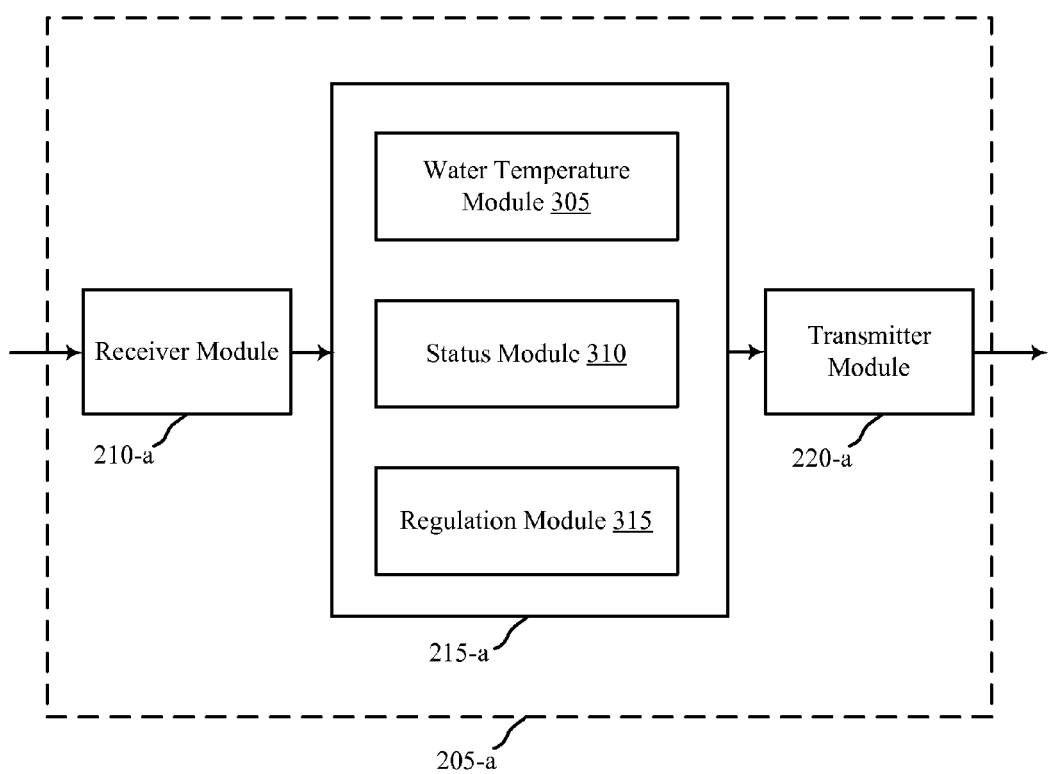
FIG. 3 shows a block diagram of a device relating to a security and/or an automation system, in accordance with various aspects of this disclosure.

FIG. 3 shows a block diagram 300 of a control panel 205-a for use in wireless communication, in accordance with various examples. The control panel 205-a may be an example of one or more aspects of a control panel 105 described with reference to FIG. 1. It may also be an example of a control panel 205 described with reference to FIG. 2. The control panel 205-a may include a receiver module 210-a, a water heater module 215-a, and/or a transmitter module 220-a, which may be examples of the corresponding modules of control panel 205. The control panel 205-a may also include a processor. Each of these components may be in communication with each other. The water heater module 215-a may include a water temperature module 305, a status module 310, and an regulation module 315. The receiver module 210-a and the transmitter module 220-a may perform the functions of the receiver module 210 and the transmitter module 220, of FIG. 2, respectively.

The water temperature module 305 may set various temperatures for various parameters. The parameters may comprise user settings, defaults settings, learned settings, or the like. The user settings may comprise desired water temperature for a residence. The default settings may be a system default for safety and efficiency purposes. Learned settings may comprise adjusting water temperature settings based at least in part on the habits of occupants of the residence. The learned settings may additionally comprise one or more settings based on calendar events or the like.

The various temperature settings of the water temperature module 305 may additionally be based at least in part on the type of water heater and its components. Some water heaters may have a larger water holding capacity than others. Additionally, some water heaters may comprise a tempering valve or a hot water heat recycling system. If the water heater comprises a tempering valve, the internal water temperature may be increased but the water released at the tempering valve may be set to a lower temperature. For example, the internal water temperature may be set to a sanitation level, approximately 140 degree Fahrenheit or higher. However, some users may be sensitive to water at this temperature. Therefore, the tempering valve may mix water from the water heater with cooler water. The tempering valve may reduce the temperature of water emerging directly from the water heater and release hot water at a more comfortable temperature for the user(s).

Various water temperature settings may comprise a temperature setting for when occupants of the residence are away for an extended period of time. An extended period of time may comprise a vacation, a long weekend, or the like. The water temperature setting may additionally comprise a daytime setting when occupants may be away from a residence or a nighttime setting when occupants may be resting. The water temperature may be elevated during the morning when hot water may be used at higher rate due to cleansing rituals or the like. For example, the water temperature may be raised to a higher temperature and then mixed with cooler water at a tempering valve to essentially allow the residence a greater supply of hot water for set time frames such as a morning routine when occupants are showering and preparing for the day. The water temperature may then have a different setting for when most, or all, occupants are away from the house.

Additionally, the water temperature module 305 may be linked to other settings of the automation system. For example, the water temperature module 305 may have a predetermined water temperature for when the system is set to "Away," "Vacation," or the like. The water temperature for these settings may be lower than when the residence is occupied.

The status module 310 may continuously monitor a water temperature of the water heater. The water temperature may comprise either an internal water temperature or a water temperature at a tempering valve. The status module 310 may comprise one or more threshold alerts. The thresholds alerts may cause a notification to be sent to a user or another personnel. The threshold alerts may concern elevated water temperatures above safety levels, water temperature below a threshold wherein the requested hot water amount or temperature will not be satisfied, a faulty water heater, or the like. The status module 310 may additionally update the control panel 105-a with one or more statuses of the water heater.

The status module 310 may additionally monitor one or more parameters of the residence For example, the status module 310 may monitoring an occupancy level of the residence. The occupancy level may comprise a number of inhabitants and/or users proximate the automation system. The status module 310 may use a direction motion detector to sense the incoming and outgoing bodies within an automation system. The status module 310 may additionally determine a number of mobile devices associated with the user that are proximate the automation system. The status module 310 may use any other form of determining an occupancy count for a building. The status module 310 may also monitor a status of the occupants within the building. For example, the occupants may be resting or may be working or doing another activity not requiring hot water or an excessive amount of hot water.

The regulation module 315 may calculate and command one or more adjustments to the internal water temperature based on one or more inputs. The inputs may comprise a setting of the security and/or automation system, an occupancy count of the residence, a user setting, a default setting, a safety setting, and the like. For example, if the automations system is set to vacation, the regulation module 315 may adjust the water temperature to a vacation temperature set by the water temperature module 305. Additionally, the regulation module 315 may determine when the vacation may be nearing an end and may adjust the water temperature to a normal operating level prior to the user's return. This may ensure hot water is ready for occupants of the residence.

In some embodiments, the automation system may track a location of its users by tracking a location of a mobile device. In these embodiments, the water temperature may be set to an away mode then the occupancy status of the residence is zero. However, if the automation system determines one or more occupants is returning to the residence, the regulation module 315 may readjust the water temperature to a normal operating temperature per the water temperature module 305.

Additionally, the regulation module 315 may respond to one or more emergency situations. For example, if the water heater is overheating and causing a potentially unsafe condition, the regulation module 315 may automatically terminate power to the water heater in an attempt to reduce the internal temperature. Additionally, the regulation module 315 may simply reduce an operating temperature of the water heater and, in the interim, adjust a water temperature at the tempering valve to allow user safe water temperature to be distributed.

Figure 4:
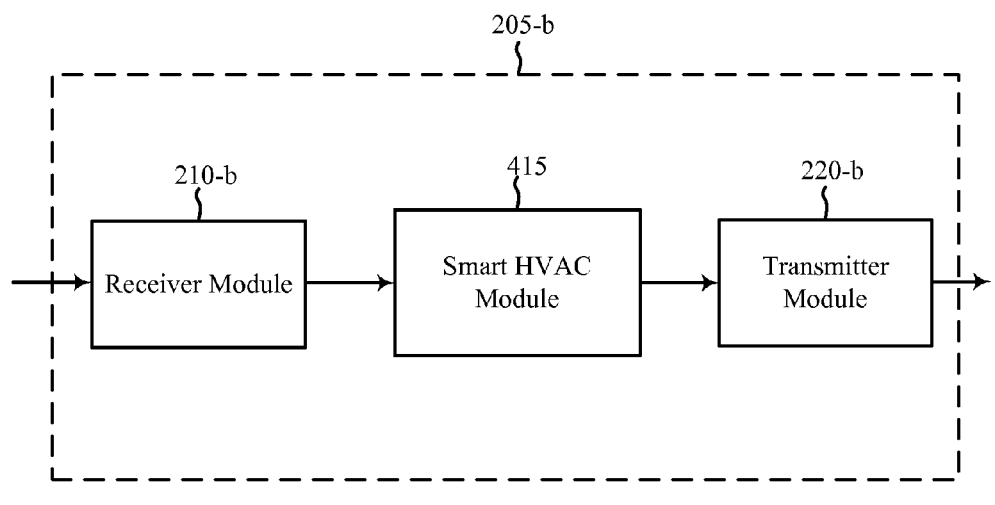
FIG. 4 shows a block diagram relating to a security and/or an automation system, in accordance with various aspects of this disclosure.

FIG. 4 shows a block diagram 400 of a control panel 205-b for use in electronic communication, in accordance with various aspects of this disclosure. The control panel 205-b may be an example of one or more aspects of a control panel 105 described with reference to FIG. 1. The control panel 205-b may include a receiver module 210-b, a smart HVAC module 415, and/or a transmitter module 220-b. The control panel 205-b may also be or include a processor. Each of these modules may be in communication with each other—directly and/or indirectly.

The components of the control panel 205-b may, individually or collectively, be implemented using one or more application-specific integrated circuits (ASICs) adapted to perform some or all of the applicable functions in hardware. Alternatively, the functions may be performed by one or more other processing units (or cores), on one or more integrated circuits. In other examples, other types of integrated circuits may be used (e.g., Structured/Platform ASICs, Field Programmable Gate Arrays (FPGAs), and other Semi-Custom ICs), which may be programmed in any manner known in the art. The functions of each module may also be implemented—in whole or in part—with instructions embodied in memory formatted to be executed by one or more general and/or application-specific processors.

The receiver module 210-b may receive information such as packets, user data, and/or control information associated with various information channels (e.g., control channels, data channels, etc.). The receiver module 210-b may be configured to receive one or more inputs from one or more sensors (e.g. sensors 150, FIG. 1) proximate an area or room of a building. Information may be passed on to the smart HVAC module 415, and to other components of the control panel 205-b.

The smart HVAC module 415 may enable monitoring of an environment in association with one or more rooms of a building, analyzing the temperature of each room of the building and adjusting one or more aspects of an HVAC system based on a climate policy. For example, the smart HVAC module 415 may adjust the rate of airflow, adjust a tint level of a tintable window, raise or lower slats on automated blinds, and/or tilt the slats of the automated blinds.

The transmitter module 220-b may transmit the one or more signals received from other components of the control panel 205-b. The transmitter module 220-b may transmit one or more commands to the one or more sensors proximate louvers, shades, or the like. The transmitter module 420 may additionally transmit one or more pieces of information, request, alerts, or the like to a user associated with the automation system and/or a server associated with the automation system. In some examples, the transmitter module 220-b may be collocated with the receiver module 210-b in a transceiver module.

Figure 5:
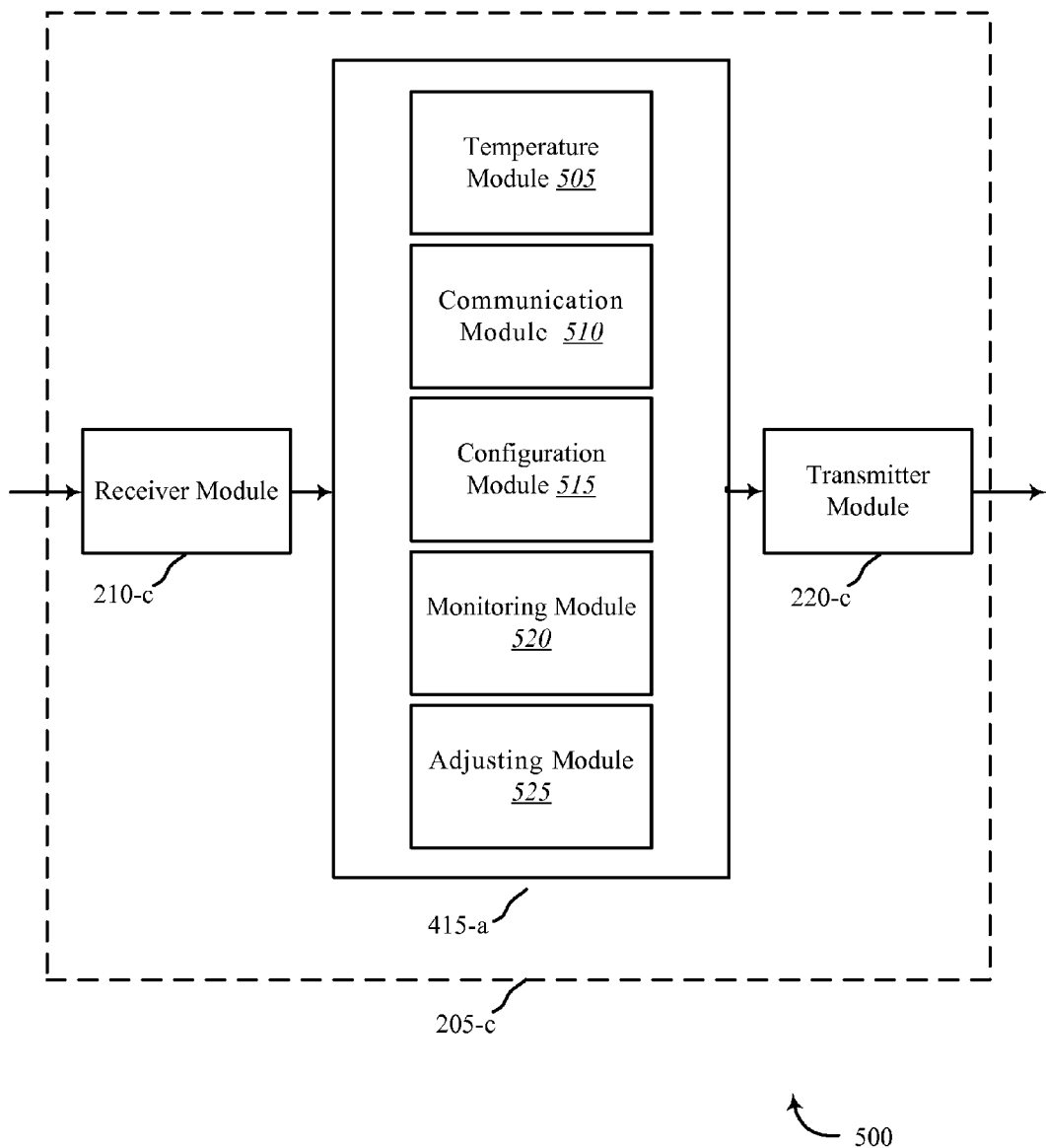
FIG. 5 shows a block diagram of an apparatus relating to a security and/or an automation system, in accordance with various aspects of this disclosure

FIG. 5 shows a block diagram 500 of a control panel 205-c for use in wireless communication, in accordance with various examples. The control panel 205-c may be an example of one or more aspects of a control panel 105 described with reference to FIG. 1. It may also be an example of a control panel 205 described with reference to FIG. 2-4. The control panel 205-c may include a receiver module 210-c, a smart HVAC module 415-a, and/or a transmitter module 220-c, which may be examples of the corresponding modules of control panel 205. The control panel 205-c may also include a processor. Each of these components may be in communication with each other. The smart HVAC module 415-a may include temperature module 505, a communication module 510, a configuration module 515, a monitoring module 520, and an adjusting module 525. The receiver module 210-c and the transmitter module 220-c may perform the functions of the receiver module 210 and the transmitter module 220-b, of FIG. 4, respectively.

In one embodiment, temperature module 505 may measure a temperature of a first room of a building via a first thermometer placed in the first room. Similarly, temperature module 505 may measure a temperature of a second room of the building via a second thermometer placed in the second room. In some cases, the first and/or second thermometers may be integrated into elements of either room. For example, the first thermometer may be integrated into a light switch in the first room. Likewise, the second thermometer may be integrated into an electrical outlet in the second room. In some cases the second thermometer may be integrated in window blinds on a window of the second room.

In some embodiments, communication module 510 may receive the temperature of the first room via a first data communication device communicatively coupled to a first HVAC register in the first room. For example, the first data communication device may include a wireless network communication device. The first data communication device may be configured to communicate data between the first thermometer and the control panel 205-c. In some embodiments, communication module 510 may receive the temperature of the second room via a second data communication device communicatively coupled to a second HVAC register in the second room. Accordingly, the second data communication device may be configured to communicate data between the second thermometer and the control panel 205-c. Thus, the temperature of each room in a building may be monitored and relayed to the control panel 205-c.

In some embodiments, communication module 510 may send a command to the first data communication device. This command may include instructions to actuate a motor on the first HVAC register. The motor may be configured to adjust louvers on the first HVAC register. Thus, the airflow into any room may be adjusted automatically via automation commands instructing an automated HVAC register to open and/or close the louvers of the register. In some cases, configuration module 515 may configure a climate policy for the first room. One or more sensors associated with a room of the building may be configured to monitor airflow in the room, an outside temperature, and the like. Configuration module 515 may configure a command based at least in part on one or more of a monitored airflow of the first room, a monitored temperature of the first room, a monitored outside temperature, and the climate policy of the first room.

In some embodiments, communication module 510 may send a command to the second data communication device. This command may include instructions to actuate a motor on the second HVAC register of the second room. As with the first HVAC register, this motor may be configured to adjust louvers on the second HVAC register. In some cases, configuration module 515 may configure a climate policy for the second room. Configuration module 515 may configure a command based at least in part on one or more of a monitored airflow of the second room, a temperature of the second room, a monitored outside temperature, and the climate policy of the second room.

In one embodiment, the adjusting module 525 may adjust the rate of airflow of the HVAC central heating and cooling unit based at least in part on the monitoring module 520 monitoring one or more of a rate of airflow of an HVAC central heating and cooling unit in relation to an airflow threshold, an outside temperature, temperatures of the first and second rooms, a climate policy of the first room, and a climate policy of the second room.

In some embodiments, the monitoring module 520 may monitor an environment in relation to the first and/or second room of the building. Either room may include a tintable window and/or an automated blind. In addition to monitoring a temperature in a particular room and/or an outside temperature, monitoring the environment may include determining at least one of a geographical direction the tintable window faces, a time of day, a current month, a current season, a location of the building in relation to the Earth's northern and southern hemispheres, an output of a photosensor relative to the tintable window, a temperature relative to a surface of the tintable window, and a sun path for a region relative to the building. Accordingly, the climate policies of the first and/or second rooms may be configured according to the monitoring of the environment. Thus, a command to adjust a tintable window and/or automated blinds may be configured and executed according to the monitoring of the environment. Likewise, a command to adjust an HVAC register may be configured and executed according to the monitoring of the environment.

In one embodiment, the photosensor may determine whether the sun is shining on a window of a building. In one example, the monitoring module 520 may query a weather data resource for information regarding a position of the sun. The query may include information regarding the position of the sun. For example, the information may include the angle of the sun in its course from east to west, a current season, the position of the sun relative to the seasonal tilting of the sun from north to south and vice versa. In some cases, the weather data resource may include weather data on a server or a device (e.g., database 120). In some cases, the weather data resource may include an online weather forecasting service (e.g., WEATHER.COM®, etc.). Thus, the monitoring module 520 may determine that the sun is shining on a particular window of the building, but a photosensor positioned relative to this window may indicate that the sun is not shining on the window. Thus, the smart HVAC module 415-a may determine that the sun is covered by clouds, that the sky is overcast. Accordingly, smart HVAC module 415-a may send a command to adjust the tint of the tintable windows in that room, adjust the height of the automated blinds in that room, and/or adjust the tilt of the slats in the automated blinds in that room based on the climate policy for that room. For example, if the climate policy for the room specifies cooling the room, then the automated blinds may be lifted and the tint level of the tintable window adjusted to allow in light. Upon detecting the sun shining directly on the window (e.g., the sun is no longer covered by clouds), the automated blinds may be lowered and tilted to block light and heat, and the tint level adjusted to reflect the light and heat of the sun.

In one embodiment, the monitoring module 520 may determine whether an aspect of the monitored environment triggers an action associated with at least one of the automated blinds and the tintable window according to a climate policy for a particular room. Upon determining the action is triggered and the action is associated with the tintable window, adjusting module 525 may adjust a tint level of the tintable window according to the climate policy for the particular room. Upon determining the action is triggered and the action is associated with a positioning of slats on the automated blinds, adjusting module 525 may raise or lower the slats on the automated blinds according to the climate policy for the particular room. The slats may be raised or lowered by a motor. Upon determining the action is triggered and the action is associated with a tilting of slats on the automated blinds, adjusting module 525 may tilt the slats on the automated blinds according to the climate policy for the particular room. The slats may be tilted in conjunction with a motor.

Figure 6:
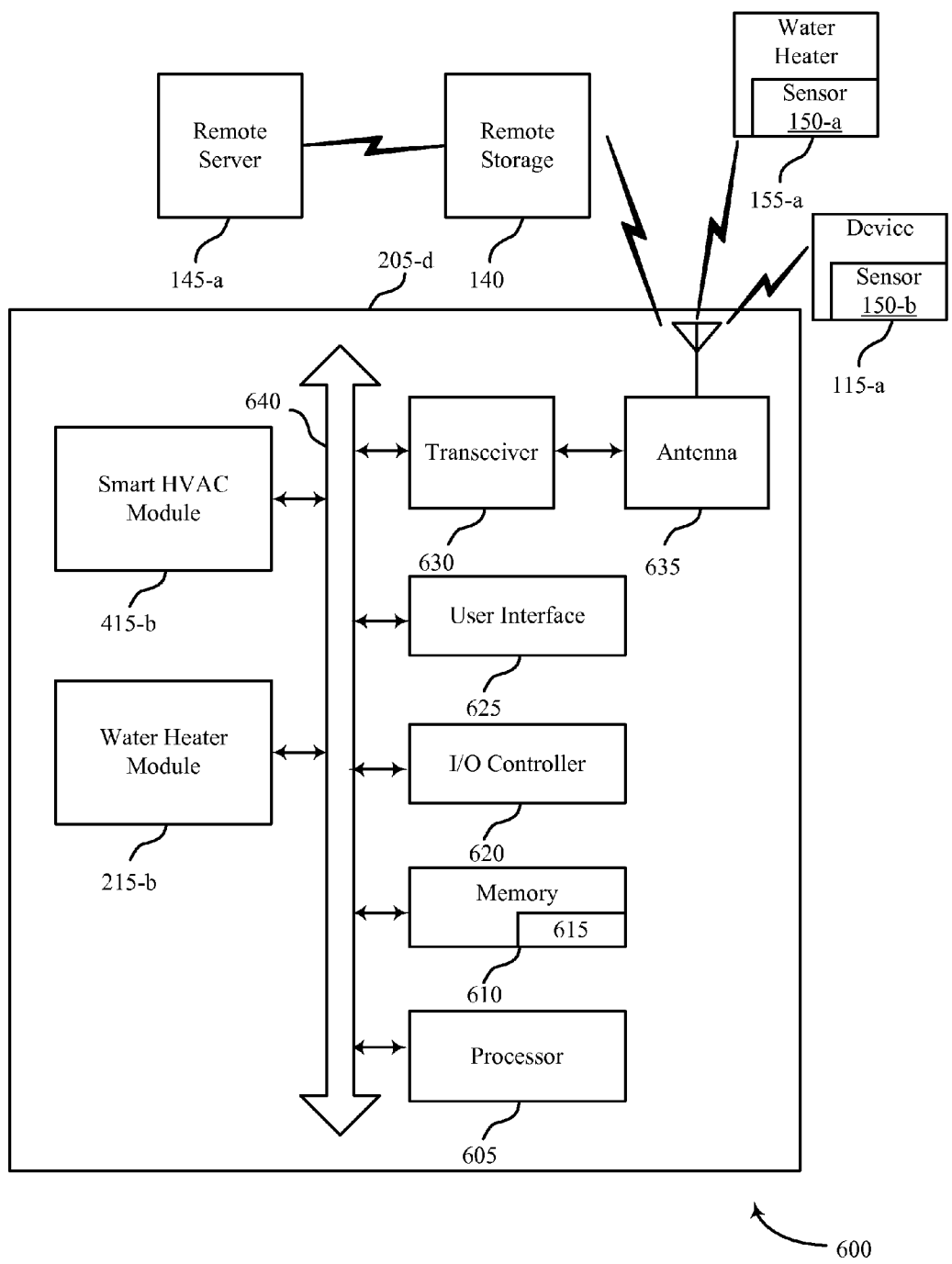
FIG. 6 shows a block diagram of an apparatus relating to a security and/or an automation system, in accordance with various aspects of this disclosure.

FIG. 6 shows a system 600 for use in efficient management of water heater systems, in accordance with various examples. System 600 may include a control panel 205-d, which may be an example of the control panels 105 of FIG. 1. Control panel 205-d may also be an example of one or more aspects of control panels 205 and/or 205-a of FIGS. 2 and 3.

The control panel 205-d may include a smart HVAC module 415-b, which may be an example of the smart HVAC module 415, 415-a described with reference to FIGS. 4 and/or 5. The control panel 205-d may also include water heater module 215-b, which may be an example of the water heater module 215, 215-a described with reference to FIGS. 2 and/or 3. In some embodiments, the terms a control panel and a control device are used synonymously.

The control panel 205-d may also include components for bi-directional voice and data communications including components for transmitting communications and components for receiving communications. For example, control panel 205-d may communicate bi-directionally with one or more of device 115-a, one or more sensors 150-a, remote storage 140, and/or remote server 145-a, which may be an example of the remote server of FIG. 1. This bi-directional communication may be direct (e.g., control panel 205-d communicating directly with remote storage 140) or indirect (e.g., control panel 205-d communicating indirectly with remote server 145-a through remote storage 140).

The smart HVAC module 415-b may monitor and efficiently control one or more aspects of an heating, ventilation, and cooling (HVAC) system based at least in part on HVAC parameters as described below with reference to FIGS. 4-5. For example, the smart HVAC module 415-b may monitor one or more environment settings relating to one or more rooms in a building and/or residence. The smart HVAC module 415-b may maintain a more uniform environmental and/or temperature conditions through a building such as a residence and/or home. The smart HVAC module 415-b may communicate with the device 115-a and/or sensor 150-b proximate each area and/or room of a building to monitor the HVAC settings.

The water heater module 215-b may efficiently manage a water heater 155-a based at least in part on user occupancy statuses and/or user settings as described above with reference to FIGS. 2 and/or 3. For example, the water heater module 215-b may monitor and maintain an efficient level of hot water in a residence to reduce energy consumption in conjunction with the sensor 150-a proximate the water heater 155-a. The water heater module 215-b may result in an adequate supply of hot water to a residence while reduce the energy bill of the residence and reduce energy waste.

The control panel 205-d may also include a processor module 605, and memory 610 (including software/firmware code (SW) 615), an input/output controller module 620, a user interface module 625, a transceiver module 630, and one or more antennas 635 each of which may communicate—directly or indirectly—with one another (e.g., via one or more buses 640). The transceiver module 630 may communicate bi-directionally—via the one or more antennas 635, wired links, and/or wireless links—with one or more networks or remote devices as described above. For example, the transceiver module 630 may communicate bi-directionally with one or more of device 115-a, remote storage 140, and/or remote server 145-a. The transceiver module 630 may include a modem to modulate the packets and provide the modulated packets to the one or more antennas 635 for transmission, and to demodulate packets received from the one or more antenna 635. While a control panel or a control device (e.g., 205-d) may include a single antenna 635, the control panel or the control device may also have multiple antennas 635 capable of concurrently transmitting or receiving multiple wired and/or wireless transmissions. In some embodiments, one element of control panel 205-d (e.g., one or more antennas 635, transceiver module 630, etc.) may provide a direct connection to a remote server 145-a via a direct network link to the Internet via a POP (point of presence). In some embodiments, one element of control panel 205-d (e.g., one or more antennas 635, transceiver module 630, etc.) may provide a connection using wireless techniques, including digital cellular telephone connection, Cellular Digital Packet Data (CDPD) connection, digital satellite data connection, and/or another connection.

The signals associated with system 600 may include wireless communication signals such as radio frequency, electromagnetics, local area network (LAN), wide area network (WAN), virtual private network (VPN), wireless network (using 802.11, for example), 345 MHz, Z-WAVE®, cellular network (using 3G and/or LTE, for example), and/or other signals. The one or more antennas 635 and/or transceiver module 630 may include or be related to, but are not limited to, WWAN (GSM, CDMA, and WCDMA), WLAN (including BLUETOOTH® and Wi-Fi), WMAN (WiMAX), antennas for mobile communications, antennas for Wireless Personal Area Network (WPAN) applications (including RFID and UWB). In some embodiments, each antenna 635 may receive signals or information specific and/or exclusive to itself. In other embodiments, each antenna 635 may receive signals or information not specific or exclusive to itself.

In some embodiments, one or more sensors 150-a (e.g., motion, proximity, smoke, light, glass break, door, window, carbon monoxide, and/or another sensor) may connect to some element of system 600 via a network using one or more wired and/or wireless connections.

In some embodiments, the user interface module 625 may include an audio device, such as an external speaker system, an external display device such as a display screen, and/or an input device (e.g., remote control device interfaced with the user interface module 625 directly and/or through I/O controller module 620).

One or more buses 640 may allow data communication between one or more elements of control panel 205-d (e.g., processor module 605, memory 610, I/O controller module 620, user interface module 625, etc.).

The memory 610 may include random access memory (RAM), read only memory (ROM), flash RAM, and/or other types. The memory 610 may store computer-readable, computer-executable software/firmware code 615 including instructions that, when executed, cause the processor module 605 to perform various functions described in this disclosure (e.g., monitoring a water temperature of the water heater, adjusting one or more water temperature settings, etc.). Alternatively, the software/firmware code 615 may not be directly executable by the processor module 605 but may cause a computer (e.g., when compiled and executed) to perform functions described herein. Alternatively, the computer-readable, computer-executable software/firmware code 615 may not be directly executable by the processor module 605 but may be configured to cause a computer (e.g., when compiled and executed) to perform functions described herein. The processor module 605 may include an intelligent hardware device, e.g., a central processing unit (CPU), a microcontroller, an application-specific integrated circuit (ASIC), etc.

In some embodiments, the processor module 605 may include, among other things, an intelligent hardware device (e.g., a central processing unit (CPU), a microcontroller, and/or an ASIC, etc.). The memory 610 can contain, among other things, the Basic Input-Output system (BIOS) which may control basic hardware and/or software operation such as the interaction with peripheral components or devices. For example, the smart HVAC module 415-b and/or the water heater module 215-b to implement the present systems and methods may be stored within the system memory 610. Applications resident with system 600 are generally stored on and accessed via a non-transitory computer readable medium, such as a hard disk drive or other storage medium. Additionally, applications can be in the form of electronic signals modulated in accordance with the application and data communication technology when accessed via a network interface (e.g., transceiver module 630, one or more antennas 635, etc.).

Many other devices and/or subsystems may be connected to one or may be included as one or more elements of system 600 (e.g., entertainment system, computing device, remote cameras, wireless key fob, wall mounted user interface device, cell radio module, battery, alarm siren, door lock, lighting system, thermostat, home appliance monitor, utility equipment monitor, and so on). In some embodiments, all of the elements shown in FIG. 6 need not be present to practice the present systems and methods. The devices and subsystems can be interconnected in different ways from that shown in FIG. 6. In some embodiments, an aspect of some operation of a system, such as that shown in FIG. 6, may be readily known in the art and are not discussed in detail in this application. Code to implement the present disclosure can be stored in a non-transitory computer-readable medium such as one or more of system memory 610 or other memory. The operating system provided on I/O controller module 620 may be iOS®, ANDROID®, MS-DOS®, MS-WINDOWS®, OS/2®, UNIX®, LINUX®, or another known operating system.

The transceiver module 630 may include a modem configured to modulate the packets and provide the modulated packets to the antennas 635 for transmission and/or to demodulate packets received from the antennas 635. While the devices 115-a may include a single antenna, the devices 115-a may have multiple antennas capable of concurrently transmitting and/or receiving multiple wireless transmissions.

Figure 7:
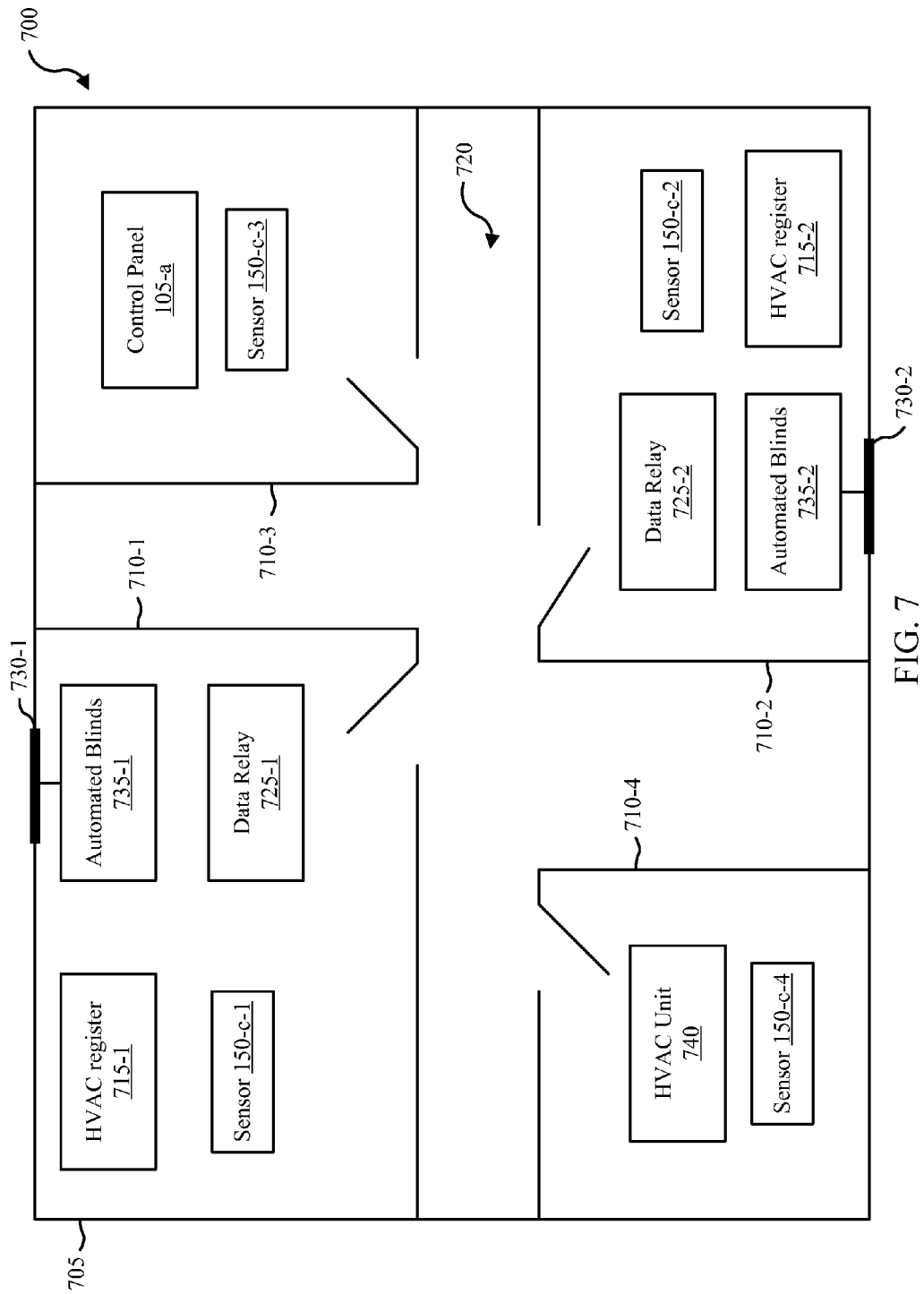
FIG. 7 shows a block diagram of an apparatus relating to a security and/or an automation system, in accordance with various aspects of this disclosure.

FIG. 7 is a block diagram illustrating one example of an environment 700 for a smart HVAC system. As depicted, building 705 (e.g., a home or office) may include one or more rooms. For example, building 705 may include rooms 710-1, 710-2, 710-3, and 710-4, as well as a central area 720 (e.g., a hallway, an entry way, an reception area, etc.). At least one room may include control panel 105-a. Room 710-4 may include HVAC unit 740. HVAC unit 740 may include a furnace and/or an air conditioning system. Each room may include duct work connected to HVAC unit 740. The duct work may attach to HVAC registers in particular rooms. One or more rooms of building 705 may include data relays, i.e., data communication devices. As depicted, room 710-1 may include data relay 725-1 and room 710-2 may include data relay 725-2. In some cases, one or more rooms may include tintable windows and automated blinds. As depicted, room 710-1 may include tintable window 730-1 and automated blinds 735-1. Likewise, room 710-2 may include tintable window 730-2 and automated blinds 735-2. Each room may include one or more sensors. As depicted, room 710-1 may include sensor 150-c-1, room 710-2 may include sensor 150-c-2, room 710-3 may include sensor 150-c-3, and room 710-4 may include sensor 150-c-4. Sensors 150-c may be examples of sensor 150 from FIG. 1. Each sensor 150-c depicted may represent one or more sensors. For example, sensor 150-c-1 may include a motion sensor, a temperature sensor, a light sensor, and so on.

The sensors 150-c may monitor the environment of each room of building 705. For example, sensors 150-c may detect the presence of a person in a room, may detect a temperature in a room and/or outside building 705, detect a level of light within a room, detect direct sun on a window of a room, etc. In some embodiments, sensor 150-c-1 may detect when a person enters room 710-1. Additionally, or alternatively, sensor 150-c-1 may measure a temperature of room 710-1. In some cases, sensor 150-c-1 may determine at least one of a geographical direction tintable window 730-1 faces, a time of day, a current month, a current season, a location of the building 705 in relation to the Earth's northern and southern hemispheres, an output of a photo-sensor relative to the tintable window, a temperature relative to a surface of the tintable window, a sun path for a region relative to the building 705, and the like.

Data relays 725 may be configured to receive data from HVAC registers 715 and/or sensors 150-c and send this data to control panel 105-a. Data relays 725 may be configured to receive data from control panel 105-a and send this data to HVAC registers 715 and/or sensors 150-c. As an example, control panel 105-a may receive a temperature of room 710-1 based on sensor 150-c-1 measuring the temperature of room 710-1, sending this temperature data to data relay 725-1, and data relay 725-1 sending this temperature data to control panel 105-a. Control panel 105-a may analyze the data from each room and generate one or more commands to control HVAC unit 740, HVAC registers 715, tintable windows 730, and/or automated blinds 735. Control panel 105-a may send a command to data relay 725-1 and data relay 725-1 may relay the command to the one or more intended targets. For example, control panel 105-a may adjust, via a relayed command, the level of tint on tintable windows 730 based on the analyzed data of the environment both in and out of building 705. Likewise, control panel 105-a may send a command to adjust the automated blinds 735-1 (e.g., raise or lower the blinds, and/or tilt the slats of the automated blinds).

As depicted, control panel 105-a may be located in one of the rooms (e.g., room 710-3 as depicted). Each room may include a speaker through which announcements may be made. Certain rooms may be occupied at any given time. In some embodiments, each room may include one or more sensors communicatively coupled to control panel 105-a. For example, room 710-1 may include sensor 150-c-1, room 710-2 may include sensor 150-c-2, room 710-3 may include sensor 150-c-1-3, and room 710-4 may include sensor 150-c-1-4.

Figure 8:
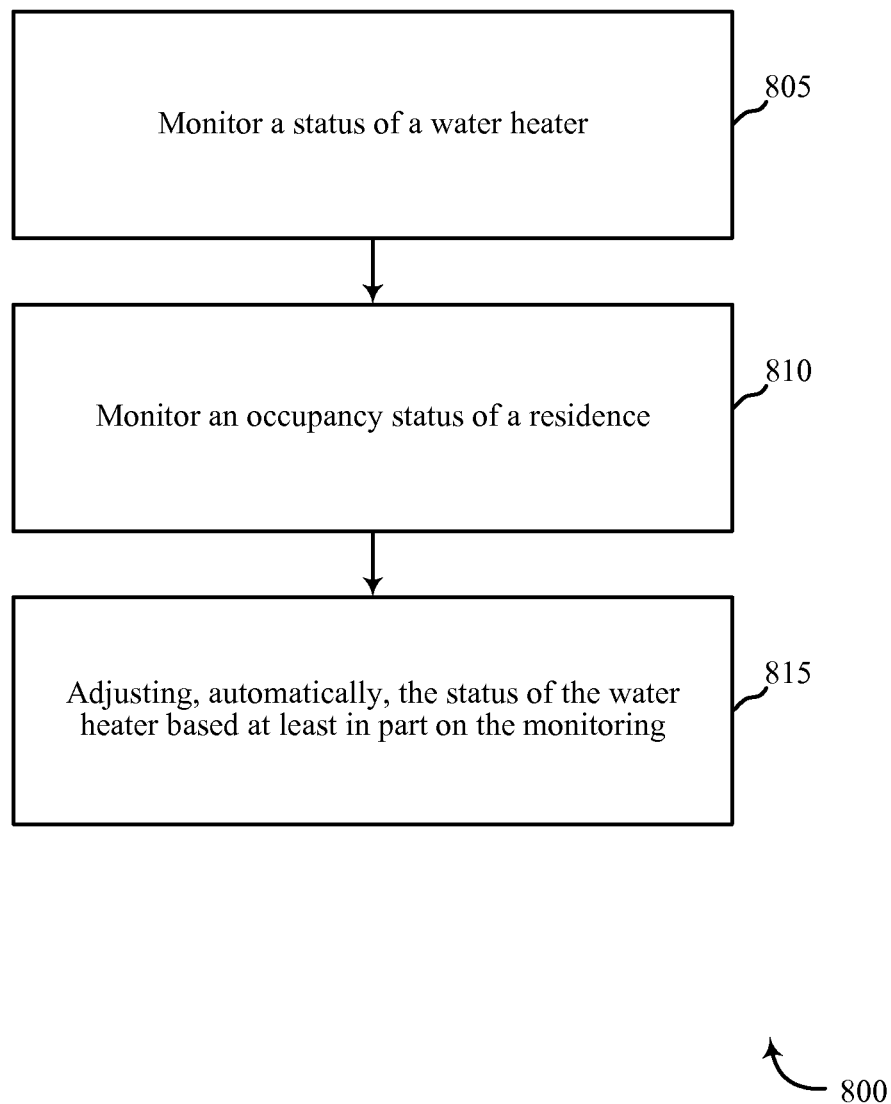
FIG. 8 is a flow chart illustrating an example of a method relating to a security and/or an automation system, in accordance with various aspects of this disclosure.

FIG. 8 is a flow chart illustrating an example of a method 800 for efficient management of a water heater, in accordance with various aspects of the present disclosure. For clarity, the method 800 is described below with reference to aspects of one or more of the water heater module 215 described with reference to FIGS. 2, 3, and 6. In some examples, one or more sensors and/or control panel may execute one or more sets of codes to control the functional elements of the water heater to perform the functions described below. Additionally or alternatively, the control panel may perform one or more of the functions described below using special-purpose hardware.

At block 805, the method 800 may include monitoring a status of a water heater. Monitoring a status of the water heater may comprise monitoring several functions of the water heater. One of the functions may comprise monitoring an internal water temperature of the water heater if the water heater comprises a tank. The water temperature after a tempering valve may be monitored. The water temperature and amount of cold water entering a tempering valve may be monitoring. The method 800 may calculate the necessary percentage of cold water being mixed with hot water to achieve a desirable output water temperature. The method 800 may additionally monitor one or more safety parameters of the water heater. The safety parameters may comprise an unsafe condition at the water heater, the use of an overflow valve due to high internal pressure in the water heater, scalding water, and the like.

At block 810, the method 800 may include monitoring an occupancy status of a residence. The occupancy status may comprise a number of occupants, an activity level of occupants, an actual activity, or the like. The method 800 may additionally monitor extended absences of occupants such that the occupants are spending at least one night away from the residence. In some embodiments, the users may set a status of the automation system which trigger an occupancy status. For example, the method 800 may monitor a status of the automation system and determine when the system is set to vacation or away. Additionally, the method 800 may determine when the system is set to home mode, work mode, night mode, or the like.

The operation(s) at block 805-810 may be performed using the status module 310 described with reference to FIG. 3.

At block 815, the method 800 may include adjusting, automatically, the status of the water heater based at least in part on the monitoring. The method 800 may increase or decrease a water temperature based at least in part on occupancy count approaching zero. For example, if a residence is empty, the method 800 may reduce the water temperature to lower energy usage and then may increase the temperature when the occupancy count exceeds a predetermined number. Additionally, the method 800 may decrease the water temperature when the automation system is set to away or a vacation status.

The operation(s) at block 815 may be performed using the regulation module 315 described with reference to FIG. 3.

Thus, the method 800 may provide for efficient management of a residential water heater relating to automation/security systems. It should be noted that the method 800 is just one implementation and that the operations of the method 800 may be rearranged or otherwise modified such that other implementations are possible.

Figure 9:
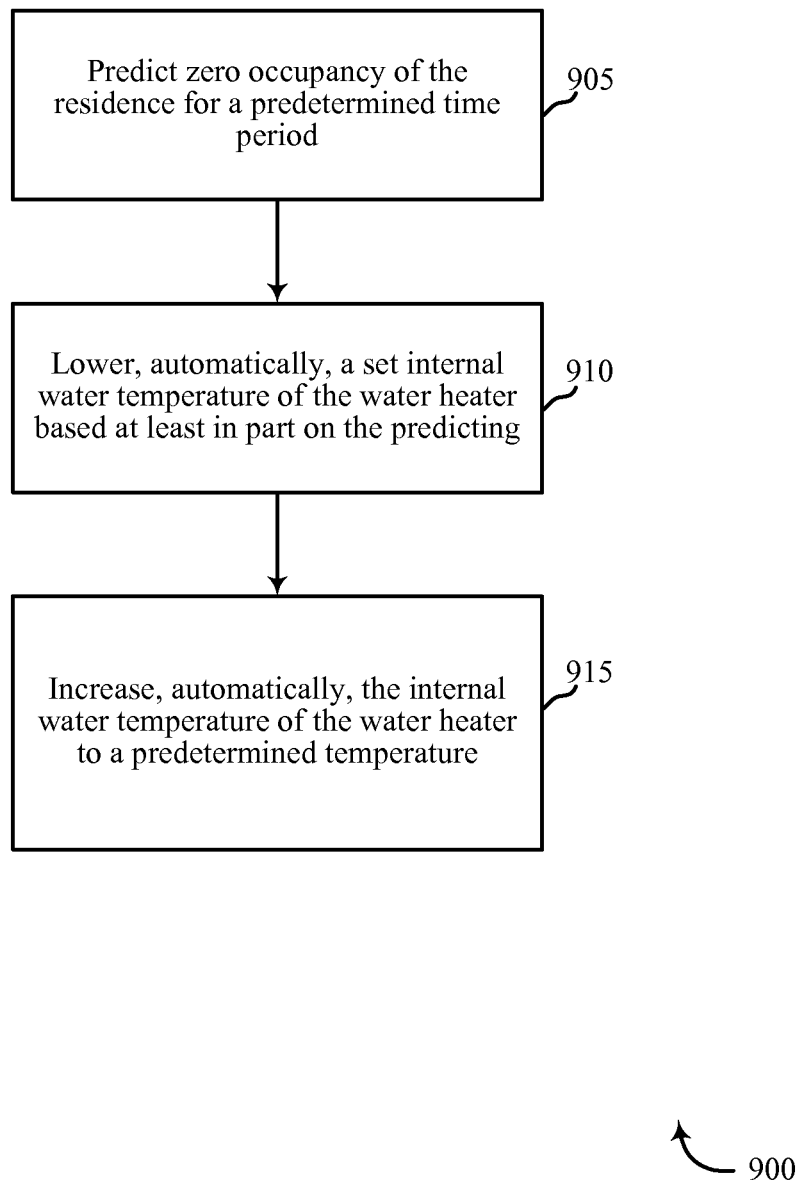
FIG. 9 is a flow chart illustrating an example of a method relating to a security and/or an automation system, in accordance with various aspects of this disclosure.

FIG. 9 is a flow chart illustrating an example of a method 900 for efficient management of a water heater, in accordance with various aspects of the present disclosure. For clarity, the method 900 is described below with reference to aspects of one or more of the water heater module 215 described with reference to FIGS. 2, 3, and 6. In some examples, one or more sensors and/or control panel may execute one or more sets of codes to control the functional elements of the water heater to perform the functions described below. Additionally or alternatively, the control panel may perform one or more of the functions described below using special-purpose hardware.

At block 905, the method 900 may include predicting zero occupancy of the residence for a predetermined time period. The automation system may be set to a specific status which may trigger the method 900. In other embodiments, the method 900 may be linked to a calendar associated with the automation system and may review extended notices on the calendar. In other embodiments, the method 900 may track a location of the occupants and determine a distance between the occupants and the residence. Based on the location of the occupants, the method 900 may approximate a length of time the user may be away from the residence.

The operation(s) at block 905 may be performed using the status module 310 described with reference to FIG. 3.

At block 910, the method 900 may include lowering, automatically, a set internal water temperature of the water heater based at least in part on the predicting. For example, if the occupants of the residence are predicted to be away for an extended period of time, the method 900 may essentially shut off the water heater or may reduce the water temperature to a point just above a freezing temperature. The method 900 may additionally reduce the water temperature lower than an operating water temperature to reduce energy usage. For example, during a daytime or nighttime when residents are typically away from the residence or resting, the water heater may reduce its temperature. In some embodiments, the residences may be equipped with two water heaters, an on-demand water heater and a sizable capacity water tank heater. The on-demand water heater may supply hot water if needed during minimum or no activity levels at a residence.

At block 915, the method 900 may include increasing, automatically, the internal water temperature of the water heater to a predetermined temperature. For example, the method 900 may determine when the occupancy count of the residence may satisfy a threshold and may increase the water temperature to an operational level based at least in part on the satisfying. The threshold may comprise an occupancy count exceeding zero. In some instances, the method 900 may track when a user is returning to the residence and may increase the internal water temperature of the water heater. For example, the method 900 may determine when a vacation is ending, or, by tracking a mobile device associated with a user, may determine when the user is en route home. Additionally, the user may have a schedule of returning to a residence at an approximate time each day and the method 900 may use this habitual pattern to alter the water heater.

The operation(s) at block 915 may be performed using the regulation module 315 described with reference to FIG. 3.

Thus, the method 900 may provide for efficient management of a residential water heater relating to automation/security systems. It should be noted that the method 900 is just one implementation and that the operations of the method 900 may be rearranged or otherwise modified such that other implementations are possible.

Figure 10:
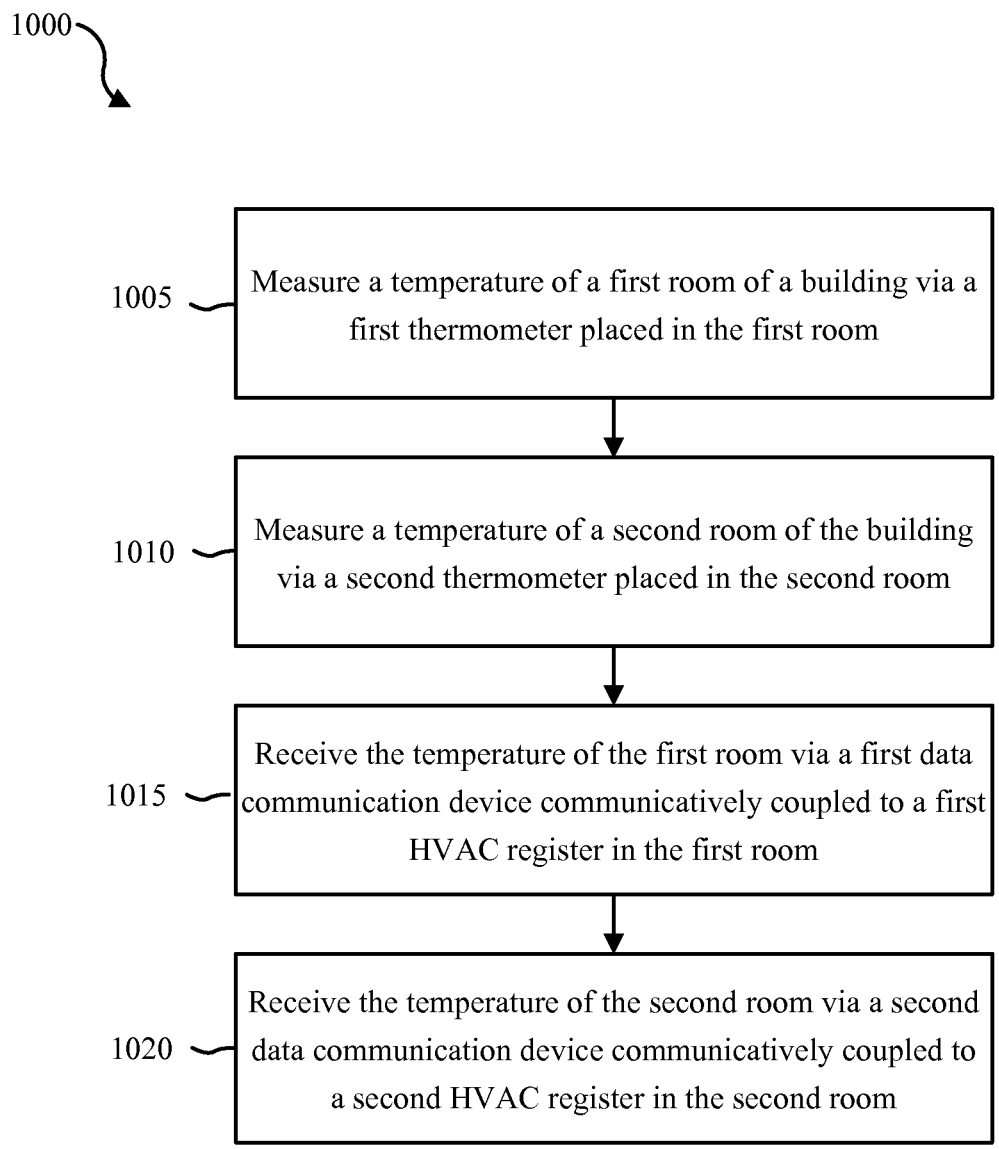
FIG. 10 is a flow chart illustrating an example of a method relating to a security and/or an automation system, in accordance with various aspects of this disclosure.

FIG. 10 is a flow chart illustrating an example of a method 1000 for efficient management of an HVAC system, in accordance with various aspects of the present disclosure. For clarity, the method 1000 is described below with reference to aspects of one or more of the smart HVAC module 415 described with reference to FIG. 4, 5, or 6. In some examples, one or more sensors and/or control panel may execute one or more sets of codes to control the functional elements of the HVAC system to perform the functions described below. Additionally or alternatively, the control panel may perform one or more of the functions described below using special-purpose hardware.

At block 1005, a temperature of a first room of a building may be measured via a first thermometer placed in the first room. At block 1010, a temperature of a second room of the building may be measured via a second thermometer placed in the second room. At block 1015, the temperature of the first room may be received via a first data communication device communicatively coupled to a first HVAC register in the first room. The first data communication device may be configured to communicate data between the first thermometer and a central automation controller. At block 1020, the temperature of the second room may be received via a second data communication device communicatively coupled to a second HVAC register in the second room. The second data communication device may be configured to communicate data between the second thermometer and the central automation controller.

Thus, the method 1000 may provide for efficient management of a residential water heater relating to automation/security systems. It should be noted that the method 1000 is just one implementation and that the operations of the method 1000 may be rearranged or otherwise modified such that other implementations are possible.

Figure 11:
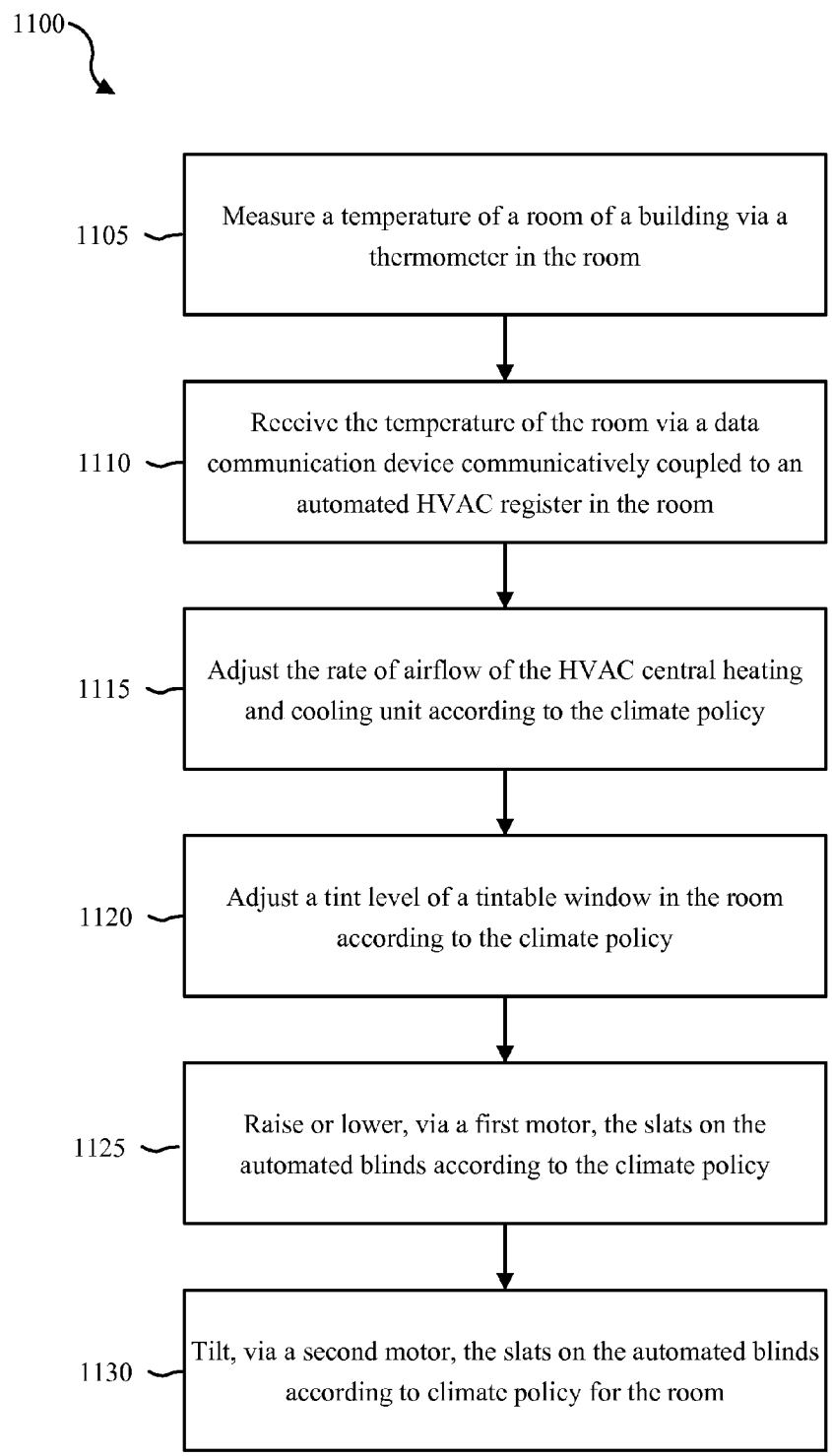
FIG. 11 is a flow chart illustrating an example of a method relating to a security and/or an automation system, in accordance with various aspects of this disclosure.

FIG. 11 is a flow chart illustrating an example of a method 1100 for efficient management of an HVAC system, in accordance with various aspects of the present disclosure. For clarity, the method 1100 is described below with reference to aspects of one or more of the smart HVAC module 415 described with reference to FIG. 4, 5, or 6. In some examples, one or more sensors and/or control panel may execute one or more sets of codes to control the functional elements of the HVAC system to perform the functions described below. Additionally or alternatively, the control panel may perform one or more of the functions described below using special-purpose hardware.

At block 1105, a temperature of a room of a building may be measured via a thermometer placed in the room. At block 1110, the temperature of the room may be received via a data communication device communicatively coupled to an automated HVAC register in the room. The data communication device may be configured to communicate data between the thermometer and a central automation controller. At block 1115, the rate of airflow of the HVAC central heating and cooling unit may be adjusted according to the climate policy. The rate of airflow may be adjusted, in accordance with the climate policy, based at least in part on one or more of an airflow threshold, a monitored rate of airflow of an HVAC central heating and cooling unit, and a monitored outside temperature. In some cases, the rate of airflow may be adjusted via positioning louvers of an automated HVAC register. At block 1120, a tint level of a tintable window in the room may be adjusted according to the climate policy. At block 1125, the slats on the automated blinds may be raised or lowered, via a first motor, according to the climate policy. At block 1130, the slats on the automated blinds may be tilted, via a second motor, according to climate policy for the room.

Thus, the method 1000 may provide for efficient management of a residential water heater relating to automation/security systems. It should be noted that the method 1000 is just one implementation and that the operations of the method 1000 may be rearranged or otherwise modified such that other implementations are possible.

In some examples, aspects from two or more of the methods 800, 900, 1000, 1100 may be combined and/or separated. It should be noted that the methods 800, 900, 1000, 1100 are just example implementations, and that the operations of the methods 800, 900, 1000, 1100 may be rearranged or otherwise modified such that other implementations are possible.

Figure 12:
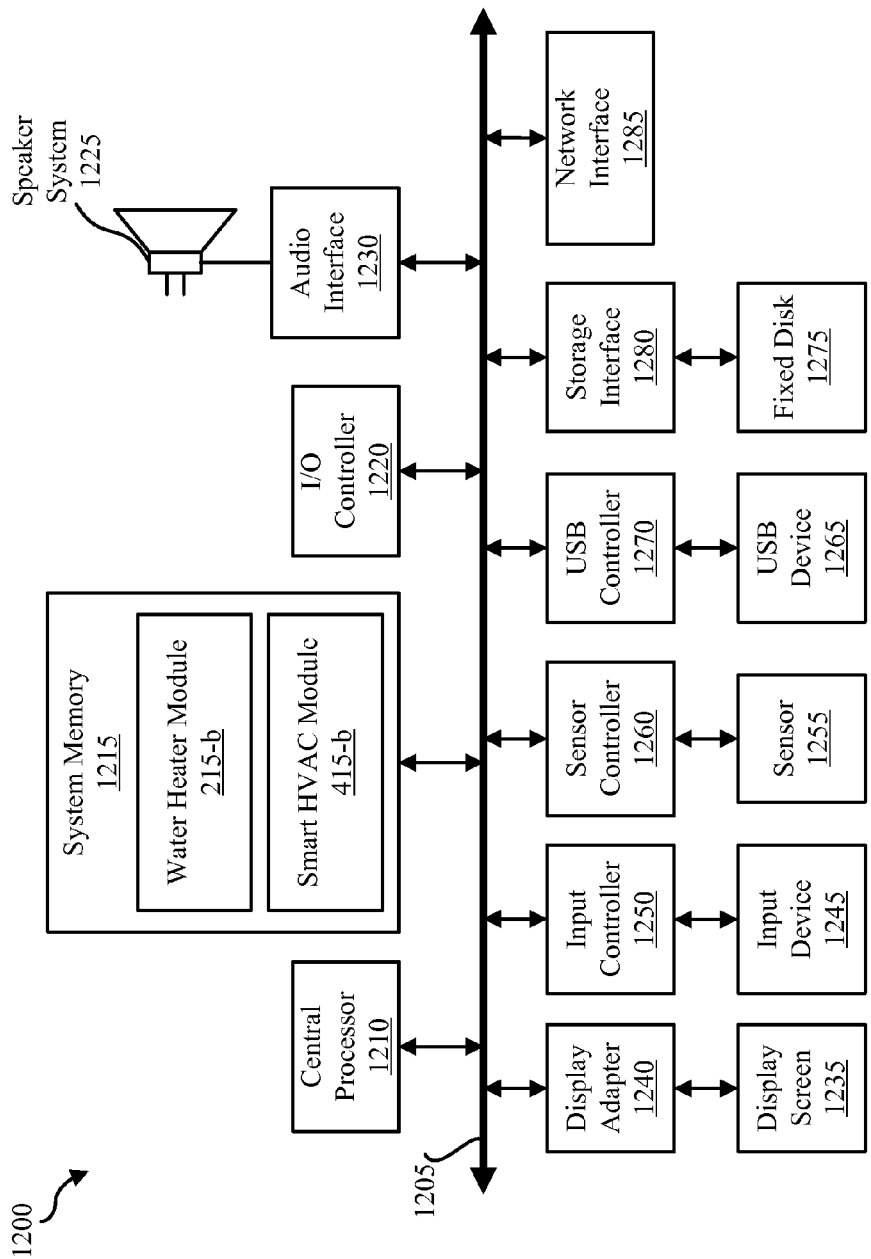
FIG. 12 shows a block diagram of an apparatus relating to a security and/or an automation system, in accordance with various aspects of this disclosure.

FIG. 12 depicts a block diagram of a computing device 1200 suitable for implementing the present systems and methods. The device 1200 may be an example of control panel 105, device 115, and/or remote server 145 illustrated in FIG. 1. In one configuration, the device 1200 includes a bus 1205 which interconnects major subsystems of device 1200, such as a central processor 1210, a system memory 1215 (typically RAM, but which may also include ROM, flash RAM, or the like), an input/output controller 1220, an external audio device, such as a speaker system 1225 via an audio output interface 1230, an external device, such as a display screen 1235 via display adapter 1240, an input device 1245 (e.g., remote control device interfaced with an input controller 1250), multiple USB devices 1265 (interfaced with a USB controller 1270), and a storage interface 1280. Also included are at least one sensor 1255 connected to bus 1205 through a sensor controller 1260 and a network interface 1285 (coupled directly to bus 1205).

Bus 1205 allows data communication between central processor 1210 and system memory 1215, which may include read-only memory (ROM) or flash memory (neither shown), and random access memory (RAM) (not shown), as previously noted. The RAM is generally the main memory into which the operating system and application programs are loaded. The ROM or flash memory can contain, among other code, the Basic Input-Output system (BIOS) which controls basic hardware operation such as the interaction with peripheral components or devices. For example, the water heater module 215-b and/or the smart HVAC module 415-b to implement the present systems and methods may be stored within the system memory 1215. Applications resident within device 1200 are generally stored on and accessed via a non-transitory computer readable medium, such as a hard disk drive (e.g., fixed disk drive 1275) or other storage medium. Additionally, applications can be in the form of electronic signals modulated in accordance with the application and data communication technology when accessed via network interface 1285.

Storage interface 1280, as with the other storage interfaces of device 1200, can connect to a standard computer readable medium for storage and/or retrieval of information, such as a fixed disk drive 1275. Fixed disk drive 1275 may be a part of device 1200 or may be separate and accessed through other interface systems. Network interface 1285 may provide a direct connection to a remote server via a direct network link to the Internet via a POP (point of presence). Network interface 1285 may provide such connection using wireless techniques, including digital cellular telephone connection, Cellular Digital Packet Data (CDPD) connection, digital satellite data connection, or the like. In some embodiments, one or more sensors (e.g., motion sensor, smoke sensor, glass break sensor, door sensor, window sensor, carbon monoxide sensor, and the like) connect to device 1200 wirelessly via network interface 1285.

Many other devices or subsystems (not shown) may be connected in a similar manner (e.g., entertainment system, computing device, remote cameras, wireless key fob, wall mounted user interface device, cell radio module, battery, alarm siren, door lock, lighting system, thermostat, home appliance monitor, utility equipment monitor, and so on). Conversely, all of the devices shown in FIG. 12 need not be present to practice the present systems and methods. The devices and subsystems can be interconnected in different ways from that shown in FIG. 12. The aspect of some operations of a system such as that shown in FIG. 12 are readily known in the art and are not discussed in detail in this application. Code to implement the present disclosure can be stored in a non-transitory computer-readable medium such as one or more of system memory 1215 or fixed disk drive 1275. The operating system provided on device 1200 may be iOS®, ANDROID®, MS-DOS®, MS-WINDOWS®, OS/2®, UNIX®, LINUX®, or another known operating system.

Moreover, regarding the signals described herein, those skilled in the art will recognize that a signal can be directly transmitted from a first block to a second block, or a signal can be modified (e.g., amplified, attenuated, delayed, latched, buffered, inverted, filtered, or otherwise modified) between the blocks. Although the signals of the above described embodiment are characterized as transmitted from one block to the next, other embodiments of the present systems and methods may include modified signals in place of such directly transmitted signals as long as the informational and/or functional aspect of the signal is transmitted between blocks. To some extent, a signal input at a second block can be conceptualized as a second signal derived from a first signal output from a first block due to physical limitations of the circuitry involved (e.g., there will inevitably be some attenuation and delay). Therefore, as used herein, a second signal derived from a first signal includes the first signal or any modifications to the first signal, whether due to circuit limitations or due to passage through other circuit elements which do not change the informational and/or final functional aspect of the first signal.

The detailed description set forth above in connection with the appended drawings describes examples and does not represent the only instances that may be implemented or that are within the scope of the claims. The terms "example" and "exemplary," when used in this description, mean "serving as an example, instance, or illustration," and not "preferred" or "advantageous over other examples." The detailed description includes specific details for the purpose of providing an understanding of the described techniques. These techniques, however, may be practiced without these specific details. In some instances, known structures and apparatuses are shown in block diagram form in order to avoid obscuring the concepts of the described examples.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and components described in connection with this disclosure may be implemented or performed with a general-purpose processor, a digital signal processor (DSP), an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, and/or state machine. A processor may also be implemented as a combination of computing devices, e.g., a combination of a DSP and a microprocessor, multiple microprocessors, one or more microprocessors in conjunction with a DSP core, and/or any other such configuration.

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope and spirit of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations.

As used herein, including in the claims, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination. Also, as used herein, including in the claims, "or" as used in a list of items (for example, a list of items prefaced by a phrase such as "at least one of" or "one or more of") indicates a disjunctive list such that, for example, a list of "at least one of A, B, or C" means A or B or C or AB or AC or BC or ABC (i.e., A and B and C).

In addition, any disclosure of components contained within other components or separate from other components should be considered exemplary because multiple other architectures may potentially be implemented to achieve the same functionality, including incorporating all, most, and/or some elements as part of one or more unitary structures and/or separate structures.

Computer-readable media includes both computer storage media and communication media including any medium that facilitates transfer of a computer program from one place to another. A storage medium may be any available medium that can be accessed by a general purpose or special purpose computer. By way of example, and not limitation, computer-readable media can comprise RAM, ROM, EEPROM, flash memory, CD-ROM, DVD, or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not to be limited to the examples and designs described herein but is to be accorded the broadest scope consistent with the principles and novel features disclosed.

This disclosure may specifically apply to security system applications. This disclosure may specifically apply to automation system applications. In some embodiments, the concepts, the technical descriptions, the features, the methods, the ideas, and/or the descriptions may specifically apply to security and/or automation system applications. Distinct advantages of such systems for these specific applications are apparent from this disclosure.

The process parameters, actions, and steps described and/or illustrated in this disclosure are given by way of example only and can be varied as desired. For example, while the steps illustrated and/or described may be shown or discussed in a particular order, these steps do not necessarily need to be performed in the order illustrated or discussed. The various exemplary methods described and/or illustrated here may also omit one or more of the steps described or illustrated here or include additional steps in addition to those disclosed.

Furthermore, while various embodiments have been described and/or illustrated here in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may permit and/or instruct a computing system to perform one or more of the exemplary embodiments disclosed here.

This description, for purposes of explanation, has been described with reference to specific embodiments. The illustrative discussions above, however, are not intended to be exhaustive or limit the present systems and methods to the precise forms discussed. Many modifications and variations are possible in view of the above teachings. The embodiments were chosen and described in order to explain the principles of the present systems and methods and their practical applications, to enable others skilled in the art to utilize the present systems, apparatus, and methods and various embodiments with various modifications as may be suited to the particular use contemplated.

What is claimed is:

1. A method for a security and automation system, comprising:

monitoring an internal water temperature of a water heater;

monitoring an occupancy status of a residence, wherein the occupancy status comprises at least a detected occupancy level of the residence and an activity status of one or more occupants comprising the detected occupancy level;

continuously adjusting, automatically, the internal water temperature of the water heater for a first time period based at least in part on the occupancy status;

predictively determining a future occupancy level of the residence for a second time period based at least in part on a configured status of the security and automation system and learned behavior of the one or more occupants;

predictively determining a future activity status of one or more anticipated occupants comprising the future occupancy level for the second time period based at least in part on the configured status of the security and automation system and learned behavior of the one or more occupants; and continuously adjusting, automatically, the internal water temperature of the water heater for the second time period based at least in part on the future occupancy level and the future activity status of the one or more anticipated occupants.

2. The method of claim 1, further comprising:
predicting zero occupancy of the residence for at least a portion of the second time period time period; and
lowering, automatically, an internal water temperature of the water heater based at least in part on the predicting.

3. The method of claim 1, further comprising:
lowering, automatically, the internal water temperature of the water heater to a predetermined temperature when the security and automation system is set to vacation status.

4. The method of claim 3, further comprising:
increasing, automatically, the internal water temperature of the water heater to a second predetermined temperature a predetermined time before the vacation status expires.

5. The method of claim 1, further comprising:
increasing, automatically, the internal water temperature of the water heater to a predetermined temperature a predetermined time before the occupancy status of the residence exceeds zero.

6. The method of claim 1, further comprising:
maintaining the internal water temperature to a predetermined water temperature when the occupancy status exceeds zero, wherein the predetermined water temperature is between 110 and 160 degrees Fahrenheit.

7. The method of claim 1, further comprising:
determining the occupancy status of the residence is at rest; and
lowering a set internal water temperature of the water heater based at least in part on the determining.

8. The method of claim 1, further comprising:
detecting when the internal water temperature of the water heater exceeds one or more safety limits; and
alerting a user based at least in part on the detecting.

9. The method of claim 1, further comprising:
maintaining a sanitization water temperature of the internal water temperature of the water heater; and
setting an external water temperature of the water heater to a lower temperature than the sanitization water temperature.

10. The method of claim 9, further comprising:
increasing, automatically, the internal water temperature of the water heater; and
maintaining, automatically, the external water temperature of the water heater.

11. The method of claim 1, further comprising:
calculating an approximate energy savings based at least in part on the adjusting;
generating an energy savings report based at least in part on the calculating; and
distributing the report to a user of the security and automation system.

12. An apparatus for a security and automation system, comprising:
a processor;
memory in electronic communication with the processor; and
instructions stored in the memory, the instructions being executable by the processor to:
monitor an internal water temperature of a water heater;
monitor an occupancy status of a residence, wherein the occupancy status comprises at least a detected occupancy level of the residence and an activity status of one or more occupants comprising the detected occupancy level;
continuously adjust, automatically, the internal water temperature of the water heater for a first time period based at least in part on the occupancy status;
predictively determine a future occupancy level of the residence for a second time period based at least in part on a configured status of the security and automation system and learned behavior of the one or more occupants;
predictively determine a future activity status of one or more anticipated occupants comprising the future occupancy level for the second time period based at least in part on the configured status of the security and automation system and learned behavior of the one or more occupants; and
continuously adjust, automatically, the internal water temperature of the water heater for the second time period based at least in part on the future occupancy level and the future activity status of the one or more anticipated occupants.

13. The apparatus of claim 12, the instructions further executable by the processor to:
predict zero occupancy of the residence for at least a portion of the second time period time period; and
lower, automatically, a set internal water temperature of the water heater based at least in part on the predicting.

14. The apparatus of claim 12, the instructions further executable by the processor to:
lower, automatically, the internal water temperature of the water heater to a predetermined temperature when the security and automation system is set to vacation status.

15. The apparatus of claim 14, the instructions further executable by the processor to:
increase, automatically, the internal water temperature of the water heater to a second predetermined temperature a predetermined time before the vacation status expires.

16. The apparatus of claim 12, the instructions further executable by the processor to:
detect when the internal water temperature of the water heater exceeds one or more safety limits; and
alert a user based at least in part on the detecting.

17. A non-transitory computer-readable medium storing computer-executable code for a security and automation system, the code executable by a processor to:
monitor an internal water temperature of a water heater;
monitor an occupancy status of a residence, wherein the occupancy status comprises at least a detected occupancy level of the residence and an activity status of one or more occupants comprising the detected occupancy level;
continuously adjust, automatically, the internal water temperature of the water heater for a first time period based at least in part on the occupancy status;
predictively determine a future occupancy level of the residence for a second time period based at least in part on a configured status of the security and automation system and learned behavior of the one or more occupants;

predictively determine a future activity status of one or more anticipated occupants comprising the future occupancy level for the second time period based at least in part on the configured status of the security and automation system and learned behavior of the one or more occupants; and adjust, automatically, the internal water temperature of the water heater for a second time period based at least in part on the future occpancy level and the future occupancy status.

18. The medium of claim 17, the code further executable by the processor to:

predict zero occupancy of the residence for at least a portion of the second time period time period; and lower, automatically, a set internal water temperature of the water heater based at least in part on the predicting.

19. The medium of claim 17, the code further executable by the processor to:

lower, automatically, the internal water temperature of the water heater to a predetermined temperature when the security and automation system is set to vacation status.

20. The medium of claim 19, the code further executable by the processor to:

increase, automatically, the internal water temperature of the water heater to a second predetermined temperature a predetermined time before the vacation status expires.

* * * * *